US009427844B2

(12) United States Patent
Diehl et al.

(10) Patent No.: US 9,427,844 B2
(45) Date of Patent: Aug. 30, 2016

(54) CENTERING MACHINE FOR WORKPIECES, PARTICULARLY OPTICAL LENSES

(71) Applicant: Satisloh AG, Baar (CH)

(72) Inventors: Joachim Diehl, Giessen (DE); Steffen Moos, Wettenberg (DE); Achim Schmidt, Lahnau (DE)

(73) Assignee: Satisloh AG, Baar (CH)

( * ) Notice: Subject to any disclaimer, the term of this patent is extended or adjusted under 35 U.S.C. 154(b) by 97 days.

(21) Appl. No.: 13/898,920

(22) Filed: May 21, 2013

(65) Prior Publication Data
US 2013/0316624 A1 Nov. 28, 2013

(30) Foreign Application Priority Data

May 22, 2012 (DE) .......................... 10 2012 010 005

(51) Int. Cl.
| | | |
|---|---|---|
| *B24B 13/005* | (2006.01) | |
| *B24B 9/14* | (2006.01) | |
| *B24B 55/02* | (2006.01) | |
| *B24B 41/04* | (2006.01) | |
| *G02B 27/62* | (2006.01) | |

(52) U.S. Cl.
CPC ............. *B24B 55/02* (2013.01); *B24B 9/146* (2013.01); *B24B 13/0055* (2013.01); *B24B 41/042* (2013.01); *G02B 27/62* (2013.01)

(58) Field of Classification Search
CPC ..... B24B 53/04; B24B 53/095; B24B 55/02; B24B 55/045; B24B 13/0055; B24B 9/146; B24B 41/042; G02B 27/62

USPC .......... 451/16, 43, 255, 256, 398, 384, 402, 451/450, 488
See application file for complete search history.

(56) References Cited

U.S. PATENT DOCUMENTS

| | | | | |
|---|---|---|---|---|
| 2,899,781 | A | * | 8/1959 | Williams ....................... 451/450 |
| 3,828,646 | A | * | 8/1974 | Borse et al. ................... 409/136 |
| 3,834,088 | A | * | 9/1974 | Matson .......................... 451/450 |
| 3,873,436 | A | * | 3/1975 | Inoue ........................ 204/224 M |

(Continued)

FOREIGN PATENT DOCUMENTS

| | | |
|---|---|---|
| DE | 87 02 561.2 U1 | 6/1987 |
| JP | 2004 042220 A | 2/2004 |

OTHER PUBLICATIONS

DIN 58736-3, Taschenbuch 383, Optikfertigung, OptoTech, dated Sep. 1997, 9 pages (legible copy from IDS submitted Jul. 26, 2013).

*Primary Examiner* — Monica Carter
*Assistant Examiner* — Marcel Dion
(74) *Attorney, Agent, or Firm* — Reising Ethington P.C.

(57) ABSTRACT

A centering machine for, in particular, optical lenses has two centering spindles. The rotationally drivable centering spindle shafts are axially aligned with respect to a centering axis and constructed at the ends for the mounting of clamping bells. A stroke device axially adjusts one centering spindle shaft relative to the other centering spindle shaft along the centering axis for alignment of the lens between the clamping bells. A clamping device applies to a centering spindle shaft a clamping force clamping the aligned lens. At least one processing unit is movable relative to the centering axis, with a tool for edge processing of the clamped lens. In order to enable an optimized bell clamping process, the stroke device and the clamping device and/or a rotary drive for the axially adjustable centering spindle shaft are arranged coaxially with respect to the centering axis.

28 Claims, 16 Drawing Sheets

(56) References Cited

U.S. PATENT DOCUMENTS

| | | | |
|---|---|---|---|
| 4,147,232 A * | 4/1979 | Gaunt et al. | 184/109 |
| 4,926,588 A | 5/1990 | Brueck | |
| 6,544,102 B2 | 4/2003 | Schafer et al. | |
| 6,865,787 B2 * | 3/2005 | Shingai et al. | 29/28 |
| 7,153,184 B2 * | 12/2006 | Kuebler et al. | 451/5 |
| 7,189,147 B2 * | 3/2007 | Igarashi et al. | 451/42 |
| 7,739,778 B2 * | 6/2010 | Fiedler et al. | 29/27 C |
| 2009/0011688 A1 * | 1/2009 | Schafer et al. | 451/256 |
| 2010/0009603 A1 * | 1/2010 | Nauche | 451/43 |
| 2010/0136885 A1 * | 6/2010 | Takeichi | 451/5 |
| 2011/0065361 A1 * | 3/2011 | Schussler et al. | 451/11 |
| 2013/0344778 A1 * | 12/2013 | Schafer et al. | 451/294 |

\* cited by examiner

CENTERING MACHINE FOR WORKPIECES, PARTICULARLY OPTICAL LENSES

TECHNICAL FIELD

The present invention relates generally to a centering machine for workpieces from the fields of precision optics, the horological industry and the semiconductor industry, where workpieces initially are to be clamped in centered position and subsequently processed and/or scanned at the edge. In particular, the invention relates to a centering machine for optical lenses, in which a lens is, for edge processing thereof, clamped in a centered position, particularly in a so-called "bell clamping method" or "bell clamping process".

PRIOR ART

Lenses for objectives or the like are centered after processing of the optical surfaces so that the optical axis, the position of which is characterized by a straight line running through the two centers of curvature of the optical surfaces, also passes through the geometric center of the lens. The lens is for this purpose initially aligned and clamped between two aligned centering spindles in such a manner that the two centers of curvature of the lens are coincident with the common axis of rotation of the centering spindles. Subsequently, the edge of the lens is processed in a defined relationship to the optical axis of the lens, as is later necessary for installation of the lens in a frame. In that case, a defined geometry is imparted to the edge depending on the respective material of the lens (glass or plastic material) by machining with geometrically undefined or defined cutting—not only in plan view of the lens, i.e. circumferential profile of the lens, but also as seen in radial section, i.e. profile of the edge, for example rectilinear formation or formation with a step or steps or facet or facets.

By the above-mentioned "bell clamping process" there is to be understood in this connection an aligning and clamping process in which the lens with its optical axis between pot-shaped clamping bells provided at the centering spindles is automatically aligned with respect to the vertically extending axis of rotation of the centering spindles before it is clamped. For this purpose, in the case of vertical arrangement of the centering spindles, the lens is placed on the clamping bell of the lower centering spindle, whereupon the clamping bell of the upper centering spindle is moved in axial direction relative to the lower clamping bell either by lowering the upper centering spindle or raising the lower centering spindle until the upper clamping bell also bears with slight pressure against the lens at the contacting phase. The lens now automatically displaces as a consequence of the curvature of the optical surfaces thereof, optionally with addition of a suitable slip-promoting agent and/or rotation of the centering spindles, in a transverse direction, in which case the clamping bells move further together for an aligning phase. The transverse movement of the lens relative to the clamping bells as well as the axial relative movement of the clamping bells ends when the lens has adopted a position between the clamping bells which enables minimum spacing of the clamping bells under the given geometric conditions. The lens, which is thus aligned by its optical axis relative to the axis of rotation of the centering spindles, is now firmly clamped between the clamping bells by increasing the clamping force in a clamping phase and then processed at the edge. Whereas the clamping or centering bells—often also referred to as clamping mandrels or centering mandrels are standardized for optical manufacturing. Incorporation by reference is expressly made with respect thereto to German Norm DIN 58736-3 of July 2001. Centering machines adapted for this procedure are commercially known, see for example, the specifications DE-A-37 44 118 and DE-A-100 08 710.

The centering machine disclosed in the specification DE-A-37 44 118 has two centering spindles, which are arranged one above the other. The centering spindle shafts are rotationally driven by way of belt drives engaging at one end, are axially aligned with respect to a centering axis and are constructed at the mutually facing ends to each mount a respective clamping bell. In this prior art the upper centering spindle is executed as an axially fixed spindle, whereas the lower centering spindle can be axially moved and clamped relative to the upper centering spindle. A pressure-medium device having a plate-shaped yoke, which is arranged below the clamping spindle generates axial movements and axial forces. A diaphragm-piston/cylinder unit is arranged centrally with respect to the clamping spindle. The unit acts on the lower end of the clamping spindle. A respective double-acting pressure cylinder with a short-stroke piston and a long-stroke piston is attached to the unit on either side of the centering axis. The pressure cylinders in the case of simultaneous pressure-loading of the short-stroke piston and long-stroke piston generate the stroke up to the point of contact of the long-stroke piston with the short-stroke piston, which is necessary in order to move the clamping bells together up to the point of a small gap between the upper clamping bell and the lens resting on the lower clamping bell. The diaphragm-piston/cylinder unit serves as a fine stroke device for the aligning process of the lens, by which the necessary force for alignment of the lens is settable. The clamping force, which is required for the processing lens and which substantially exceeds the force generated for alignment of the lens by the diaphragm piston, is then generated solely by the long-stroke piston after switching-off of the pressure acting on the short-stroke piston. The diaphragm piston settles on the yoke so that the clamping force of the long-stroke piston fully acts on the clamping spindle.

However, this prior art is capable of improvement in many respects in relation to a bell clamping process in order to render the most optimum way possible. In the case of the provided parallel arrangement of the double-acting pressure cylinders there is, apart from the comparatively high internal friction, also the risk of canting of the long-stroke piston due to stick-slip effects occurring to different extent from piston to piston. Moreover, the diaphragm piston has a certain measure of intrinsic stiffness, for which reason the force needed for aligning the lens cannot be set with very fine sensitivity. Beyond that, there is introduction particularly when the centering spindle shafts are optionally rotationally driven during the bell clamping process of a transverse force into the centering spindles. The transverse force can produce a certain amount of bending and/or transverse displacement of the centering spindle shafts in the bearing tolerance. All this can lead to so-called "impressing" of the clamping bells on the optical surfaces of the workpieces to be clamped and other instances of surface damage thereat, which should be avoided.

A centering machine is known from DE-A-100 08 710, in which a pivotable tipping lever is provided, at one end of which the axially movable centering spindle is pivotally connected. A compensating weight is pivotally connected at the other end of the tipping lever in order to produce at the tipping lever a moment which counteracts the moment generated by the axially movable centering spindle. A combined stroke and clamping device is engaged at the same end of the tipping lever as the compensating weight. The combined stroke and clamping device has, apart from a spring mechanism, a ball screw drive which is driven by an electric motor and which serves the purpose of moving a centering spindle under CNC control in axial direction relative to the other centering spindle in order to align the workpiece between the clamping bells during contacting and aligning phases and also by way of the spring mechanism to clamp it in place during the clamping phase. In this prior art as well, a processing unit is provided for edge processing of the workpiece once clamped.

This prior art mechanism, which includes a tipping lever and compensating weight, allows a finely sensitive contacting or clamping movement of the axially movable centering spindle in the direction of the workpiece, which is to be clamped, by forces which are very small and thus able to be satisfactorily metered. However, there are disadvantages in the respect that a certain amount of transverse force is again introduced by way of the tipping lever into the clamping spindle, leading to a heating process in radial direction, which can overall impair the axial alignment of the centering spindle shafts. The same disadvantages apply with respect to the rotary drive of the centering spindle shafts, which here is produced by gearwheel pairs engaging at one end.

A further problem with the previously known centering machines is with the cooling lubricant feed when edge processing of the workpiece clamped between the clamping bells is carried out by a grinding wheel which is rotatably mounted on a grinding spindle of the processing unit. In the prior art, the feed ends of cooling lubricant tubelets which are used for the cooling lubricant feed have to be positioned closely to the processing zone, i.e. the region of action between tool and workpiece. However, depending on the circumferential profile of the workpiece the processing zone migrates at the circumference of the tool so that optimal positioning of the cooling lubricant feed is possible with difficulty. In addition, high circumferential speeds of the grinding wheel additionally hamper the cooling lubricant feed. In that regard, the centrifugal forces at the grinding wheel circumference and an air cushion entrained by the grinding wheel preclude sufficient wetting of the grinding wheel circumference. The cooling lubricant jets oriented by way of the cooling lubricant tubelets onto the grinding wheel circumference ricochet off the grinding wheel. In order to prevent grinding burn of the workpiece, the speed of advance and/or speed of cutting then need to be reduced, which prolongs processing time.

What is desired is a centering machine for workpieces, particularly optical lenses, where the problems discussed above with respect to the prior art are addressed. In particular, it is desired to have a centering machine that has an improved bell clamping process in which so-called "impressions" and other instances of surface damage at the sensitive surfaces of the workpieces, which are to be clamped and processed, by the hard and sharp-edged support regions of the centering or clamping bells are reliably avoided. In addition, it is desired that a cooling lubricant supply device provides, particularly in a centering machine, an improved feed of the cooling lubricant to the region of action between tool and workpiece.

SUMMARY OF THE INVENTION

According to a first aspect of the invention a centering machine for workpieces, e.g. optical lenses, includes two centering spindles that include respective rotationally drivable centering spindle shafts. The spindle shafts are mounted in respective centering spindle housings and are axially aligned with respect to a centering axis. The centering spindle shafts are constructed at mutually facing ends to each mount a respective clamping bell. A stroke device axially adjusts one of the centering spindle shafts with respect to the other along the centering axis in order to align a workpiece between the clamping bells. A clamping device can apply a clamping force to one of the centering spindle shafts in order to clamp the workpiece aligned between the clamping bells. At least one processing unit is movable relative to the centering axis and has a tool for edge-processing of the workpiece clamped between the clamping bells. The stroke device and the clamping device are arranged coaxially with respect to the centering axis.

Due to the fact that the stroke device and clamping device lie on one and the same axis, namely the centering axis, there is no introduction by way of these devices of a transverse force during the bell-clamping process, namely in the clamping phase of the same, in conjunction with the axial adjustment of the corresponding centering spindle shaft or the axial introduction of force into the corresponding central spindle shaft. This transverse force is eliminated which otherwise could produce at the corresponding centering spindle shaft a transverse displacement, tipping moments and/or bending moments that risk the precise axial alignment of the centering spindle shafts and the circular and planar running thereof. Moreover, by virtue of the coaxial arrangement of the stroke device and clamping device there is no risk of derivation from these devices of a heating process in a direction radial with respect to the centering axis. In the result, it is possible to reliably avoid an impermissibly large (e.g. larger than 1 to 2 microns) radial and/or axial run-out as a consequence of axial introduction of force in the axial adjustment of the corresponding centering spindle shaft or shafts at the highly accurately ground clamping surfaces of the clamping or centering bells, so that as a result undesirable impressions and other instances of surface damage at the workpieces, which are to be clamped and processed, cannot arise. A further advantage of the coaxiality or of the concentricity of the stroke device and clamping device as seen along the centering axis is that this arrangement is very close to the centering axis, i.e. is a very compact construction as seen in radial direction with respect to the centering axis, so that the at least one processing unit or the tool thereof can easily reach the workpiece clamped between the clamping bells and there is no need to expend for that purpose a greater outlay in terms of hardware.

A proprietary linear motor of synchronous, asynchronous or double-meshing mode of construction, optionally with stator and actuator in lightweight construction from synthetic material parts reinforced with carbon fiber can be implemented for the stroke device. Preferably, the stroke device has a plunger coil drive (voice-coil actuator), which is operatively connected with the axially adjustable centering spindle shaft and which has at least one coil coaxial with respect to the centering axis and at least one permanent magnet co-operating with the coil. Such a plunger coil drive, in particular, due to its coaxial rotationally symmetrical form of construction can be of very compact format, and has only small moving mass which allows a very sensitive regulation of the advancing force in the contacting and aligning phases.

Although the plunger coil drive can in principle be constructed with a stationary magnet and moving-coil construction, a moving magnet construction is preferred with the permanent magnet fastened to a rotor part connected with the axially adjustable centering spindle shaft, whereas the coil surrounding the permanent magnet is mounted in a plunger coil drive housing in fixed position in the machine. In this way current supply to the plunger coil drive and cooling thereof takes place in particularly simple manner. The permanent magnet can then be of very short construction in the axial direction, i.e. substantially shorter than the coil, so that the advance forces of the plunger coil drive are advantageously substantially uniform over the entire required stroke.

In further pursuance of an aspect of the invention, the clamping device may have an annular piston which is mounted at the axially adjustable centering spindle shaft and forms on its side remote from the clamping bell end of the axially adjustable centering spindle shaft an annular effective surface defining in part with the centering spindle housing, a boundary of an annular chamber by way of which there can be pneumatic action on the annular piston in order to generate the clamping force. This design makes possible, in simple manner, a satisfactory and very sensitive regulation of the clamping force during the clamping phase of the bell clamping process and a secure retention of the workpiece during processing thereof.

In principle, the clamping spindle and fixed spindle can be arranged three-dimensionally as desired provided the coaxiality of the spindle shafts is ensured, for example in horizontal alignment or in vertical alignment, with an upper fixed spindle and a lower clamping spindle, as disclosed in the specification DE-A-37 44 118. However, a design is preferred in which the centering spindle with the axially adjustable centering spindle shaft is arranged above the other centering spindle. In this case the annular piston forms on its side facing the clamping bell end of the axially adjustable centering spindle shaft a further annular effective surface defining a boundary of a further annular chamber by way of which there can be pneumatic action on the annular piston in order to ensure pneumatic counterbalancing at the axially adjustable centering spindle shaft. A vertical arrangement of the centering spindles is at the outset advantageous insofar as automatic loading of the workpiece is substantially simplified because the workpiece placed on the lower clamping bell, by contrast with a horizontal arrangement of the centering spindle, remains at rest there. In the case of such a vertical arrangement of the centering spindles, construction of the lower centering spindle as a fixed spindle and the upper centering spindle as a clamping spindle has in addition the advantage, in particular, that gravitational force assists during lowering of the clamping spindle and thus stick-slip effects, which would render the axial spindle movement non-uniform, are less apparent at the bearings/guides. However, for a sensitive adjustment it is then necessary to counteract and provide compensation for the weight of the clamping spindle and the clamping bell mounted thereon, which in terms of hardware can be realized in simple manner by a pneumatic counterbalancing. Such pneumatic counterbalancing additionally has the advantage—by comparison with, for example, counterbalancing by a compensating weight, as disclosed in DE-A-100 08 710—that a total weight of spindle and clamping bell changing as a consequence of use of different clamping bells can be easily taken into account. In this regard, the mentioned use of the annular piston with its annular effective surface in a double-acting annular piston and annular cylinder arrangement is particularly advantageous, because of its coaxial position with respect to the centering axis and the use of merely an annular piston results not only in a very compact construction, particularly in both radial and axial directions, but also equally ensures that both in application of the clamping force and in withstanding the weight of clamping spindle and clamping bell no transverse forces are exerted on the corresponding centering spindle shaft.

In principle, the annular piston can be constructed with seals, which would have the advantage of low consumption of compressed air. However, an unsealed construction of the annular piston is preferred, whereby any stick-slip effects such as seal wear at the annular piston are avoided. In addition, a slight compressed air leakage over the circumferential surface enables finer pressure regulation by, for example, a servo pressure regulating valve, with at the same time better regulating hysteresis, since it is not necessary to firstly diminish an excessive pressure at the valve itself.

According to a second aspect of the invention a centering machine for workpieces, e.g. optical lenses, includes two centering spindles that include respective rotationally drivable centering spindle shafts. The shafts are mounted in respective centering spindle housings and are axially aligned with respect to a centering axis. The centering spindle shafts are constructed at mutually facing ends to each mount a respective clamping bell. A stroke device axially adjusts one of the centering spindle shafts relative to the other one of the centering spindle shafts along the centering axis in order to align a workpiece between the clamping bells. A clamping device can apply a clamping force to one of the centering spindle shafts so as to clamp the workpiece aligned between the clamping bells. At least one processing unit is movable relative to the centering axis and has a tool for edge processing of the workpiece clamped between the clamping bells. The centering spindle shaft being axially adjustable by way of the stroke device is rotationally drivable by a rotary drive which, like the stroke device, is also arranged coaxially with respect to the centering axis.

The coaxial arrangement of the stroke device and the rotary drive for the axially adjustable centering spindle shaft on one and the same axis, namely the centering axis produces no transverse force to the corresponding centering spindle shaft by way of these devices during the bell clamping process when the centering spindle shafts, particularly in the alignment phase of the bell clamping process, are optionally rotationally driven. Neither is there an application of transverse force in connection with axial adjustment of the corresponding centering spindle shaft or the axial force introduction into the corresponding centering spindle shaft nor in connection with the rotary drive of the corresponding centering spindle shaft. Due to the centered arrangement of the rotary drive with respect to a centering axis, only a torque about the centering axis is generated at the corresponding centering spindle shaft. As a consequence thereof there is no risk of a transverse displacement or tipping and/or bending moments at the corresponding, rotationally driven centering spindle shaft, which could risk precise axial alignment of the centering spindle shafts and the circular and planar running thereof. Moreover, the coaxial arrangement of stroke device and rotary drive has no risk of a heating process, with respect to the centering axis radial direction, emanating from these subassemblies. As a result, undesirable impressions and other instances of surface damage, which could arise in the case of an unacceptable radial and/or axial run-out of the clamping or centering bells due to deficient axial alignment of the rotationally driven centering spindle shafts, at the workpieces which are to be clamped and processed are reliably avoided. Moreover, the need of the arrangement concerned for constructional space in radial direction as seen relative to the centering axis is advantageously small, which is required for good accessibility of the workpiece, which is clamped between the clamping bells, during processing thereof.

In an advantageous embodiment of the centering machine the rotary drive can be constructed as an internal rotor torque motor. A stator may be mounted in the centering spindle housing and a rotor, surrounded by the stator is attached to the outer circumference of the axially adjustable centering spindle shaft. The rotor is longer than the stator and is axially displaceable relative to the stator together with the axially adjustable centering spindle shaft. Advantages of the torque motor are, in contrast to a conventional three-phase alternating current asynchronous motor or stepping motor, that the torque motor has only small cogging i.e. stick-slipping during rotational movement, caused by magnetic forces, and can directly exert high torques and holding moments with high setting accuracy. Even during processing of the workpiece clamped between the clamping bells it is possible to ensure very good synchronous running of the centering spindle shafts or good securing against unintended twisting.

For axial and rotational mounting of the axially adjustable centering spindle shaft use can be made, in principle, of slide bearings or magnetic bearings. With respect to smallest possible bearing play, freedom from stick-slip effects and low wear with manageable cost it is preferred if an air bearing arrangement mounts the axially adjustable centering spindle shaft to be axially displaceable and rotatable in the centering spindle housing. The air bearing arrangement then preferably has at least two air bearing sections, wherein the rotary drive is arranged axially between the air bearing sections, which ensures a high level of stiffness of the guide.

Advantageously, an axial run-out measuring device for checking the centering or for checking the alignment of the workpiece after the bell clamping process can be integrated in the centering machine, by which the axial position of an end-face edge region of the workpiece clamped between the clamping bells can be detected in a direction parallel to the centering axis. Such an economically realizable measuring device can be provided alternatively or additionally to a laser centering device, which is known per se, and is of advantage particularly when it is necessary to center workpieces with highly reflective or only slightly transparent surfaces, in which circumstances laser centering devices reach their limits.

The axial run-out measuring device preferably has a contact caliper for positioning with respect to the end-face edge region to be scanned at the workpiece. The contact caliper is movable together with the processing unit. By comparison with equally conceivable contactless sensors, such as optical sensors, there are advantages here at the outset in the respect that such contact calipers are robust, have a good cost/performance ratio and operate regardless of the material characteristics (for example, reflective or absorbent) of the workpiece, in which connection even slight amounts of contamination (for example, cooling lubricant droplets) on the workpiece surfaces to be scanned do not represent problems. Because the contact caliper is, in addition, movable together with the processing unit, advantageously no additional movement axes are required for the axial run-out measuring device.

In an advantageous embodiment the caliper of the axial run-out measuring device can be movable relative to the processing unit from a protected park position behind the tool to a measuring position protruding relative to the tool and conversely, so that the caliper is protected during the actual edge processing and there is no need to worry about collision with the workpiece.

According to a third aspect of the invention, a cooling lubricant supply device for the supply of a cooling lubricant to a grinding wheel that is rotatably mounted on a grinding spindle of a processing unit has a feed shoe, which is mounted at least indirectly on a grinding spindle housing and seated on a circumferential surface of the grinding wheel. The feed shoe has a seating surface facing the grinding wheel. The seating surface has a shape substantially complementary with the circumferential surface of the grinding wheel and being provided centrally with a pocket-like recess into which the cooling lubricant can be fed under pressure. A spring mechanism biases the feed shoe with its seating surface against the circumferential surface of the grinding wheel.

The feed of the cooling lubricant to the grinding wheel thus takes place at a shape-locking gap between the circumferential surface of the grinding wheel and the seating surface of the feed shoe, which, constructed as a shaped member, has in the region of its seating surface a negative contour of substantially the same shape with respect to the edge contour of the grinding wheel, in particular as seen in both transverse section and longitudinal section. The feed shoe is pressed by the spring mechanism in the direction of the grinding wheel. This gap sets itself automatically when the feed shoe as a consequence of feed of the cooling lubricant under pressure into the pocket-like recess lifts off slightly from the grinding wheel against the spring force of the spring mechanism, in which case the gap width or gap height is dependent on the feed pressure of the cooling lubricant. The cooling lubricant is radially placed by the feed shoe on the grinding wheel and is subsequently entrained by the rapidly rotating grinding wheel by contrast with being sprayed onto the grinding wheel.

Tests by the applicant have unexpectedly revealed that the thus-supplied liquid cooling lubricant remains for a comparatively long time on the grinding wheel (in part still over a grinding wheel sector of 90°) before it is spun off by the grinding wheel due to centrifugal force as compared with the prior art outlined in the introduction. Thus, the feed shoe, which interrupts or strips off from the grinding wheel the entrained air cushion described in the introduction, can be positioned relatively far away from the point of action between grinding wheel and workpiece without counteracting a sufficient cooling or lubrication effect. Resulting therefrom are not just advantages concerning workpiece handling; in particular, migration of the point of action between grinding wheel and workpiece at the grinding wheel circumference which arises specifically when the workpiece edge as seen in plan view departs from a circular shape does not cause any problems with respect to sufficient cooling or lubrication. The thus-produced optimum wetting and thus cooling and washing of the grinding wheel circumference further minimizes tool wear. Moreover, it allows high speeds of advance and cutting as well as at the same time performance of a so-called "deep-grinding method" in which tool and workpiece are in engagement not only linearly or punctiformly, but also over a large area, which leads to correspondingly higher levels of machining performance e.g. improved rates of material removal.

Although centering machines are a preferred field of application or use for the afore-described cooling lubricant supply device, the latter is of equal interest for other grinding machines in the field of optics, for example also for grinding machines with circumferential grinding wheels which serve for approximately punctiform processing of for example aspherical lenses in rotary circumferential transverse or longitudinal grinding methods.

In a preferred embodiment of the cooling lubricant supply device the guide shoe is made from a machinable material, preferably synthetic material, wherein the seating surface of the guide shoe is ground by the grinding wheel as a negative contour of the circumferential surface of the grinding wheel. An advantage results that the seating surface at the feed shoe can thus be produced with contour precision in simple manner and also to the extent that a grinding wheel contour changing due to wear additionally transfers to the guide shoe and, in particular, automatically during processing of the workpiece.

The biasing force of the spring mechanism is preferably settable so that the width or height of the afore-described gap between grinding wheel and feed shoe is variable apart from the feed pressure of the cooling lubricant. In a given case, the feed pressure of the cooling lubricant can also be kept constant by the setting of the gap. The gap is thus settable in simple manner by way of two variable magnitudes (e.g. pressure, spring force), so that wetting of the grinding wheel by the cooling lubricant can be easily optimized in correspondence with the respective use requirements.

Finally, it is preferred if the feed shoe is pivotally connected, by way of a shoe holder, with a joint, which is fixed relative to the grinding spindle housing and which as seen in the rotational direction of the grinding wheel lies in front of the feed shoe so that the feed shoe is placeable substantially tangentially against the circumferential surface of the grinding wheel. Linear guidance of the feed shoe in radial direction relative to the axis of rotation of the grinding wheel is indeed equally foreseeable. However, the afore-described pivotable connection of the feed shoe is, on the other hand, advantageous to the extent that it can achieve more economical, positioning of the feed shoe at the grinding wheel. Change of the feed shoe or the grinding wheel is simpler and the risk of canting or jamming is basically no longer present.

BRIEF DESCRIPTION OF THE DRAWINGS

The invention is explained in more detail in the following by way of a preferred embodiment of a centering machine with reference to the accompanying, partly simplified or schematic drawings. For simplification of the illustration, apart from parts of the cladding of the centering machine, the operating unit and control, discs, deposits for workpieces and tools, the supply devices (inclusive of lines, hoses and pipes) for current, compressed air and cooling lubricant, the return for the cooling lubricant as well as the measuring, maintenance and safety devices, in particular, were also mostly omitted from the drawings, in every instance to the extent that they were not required for understanding of the invention.

In the drawings.

DETAILED DESCRIPTION OF THE EMBODIMENT

Figure 1:
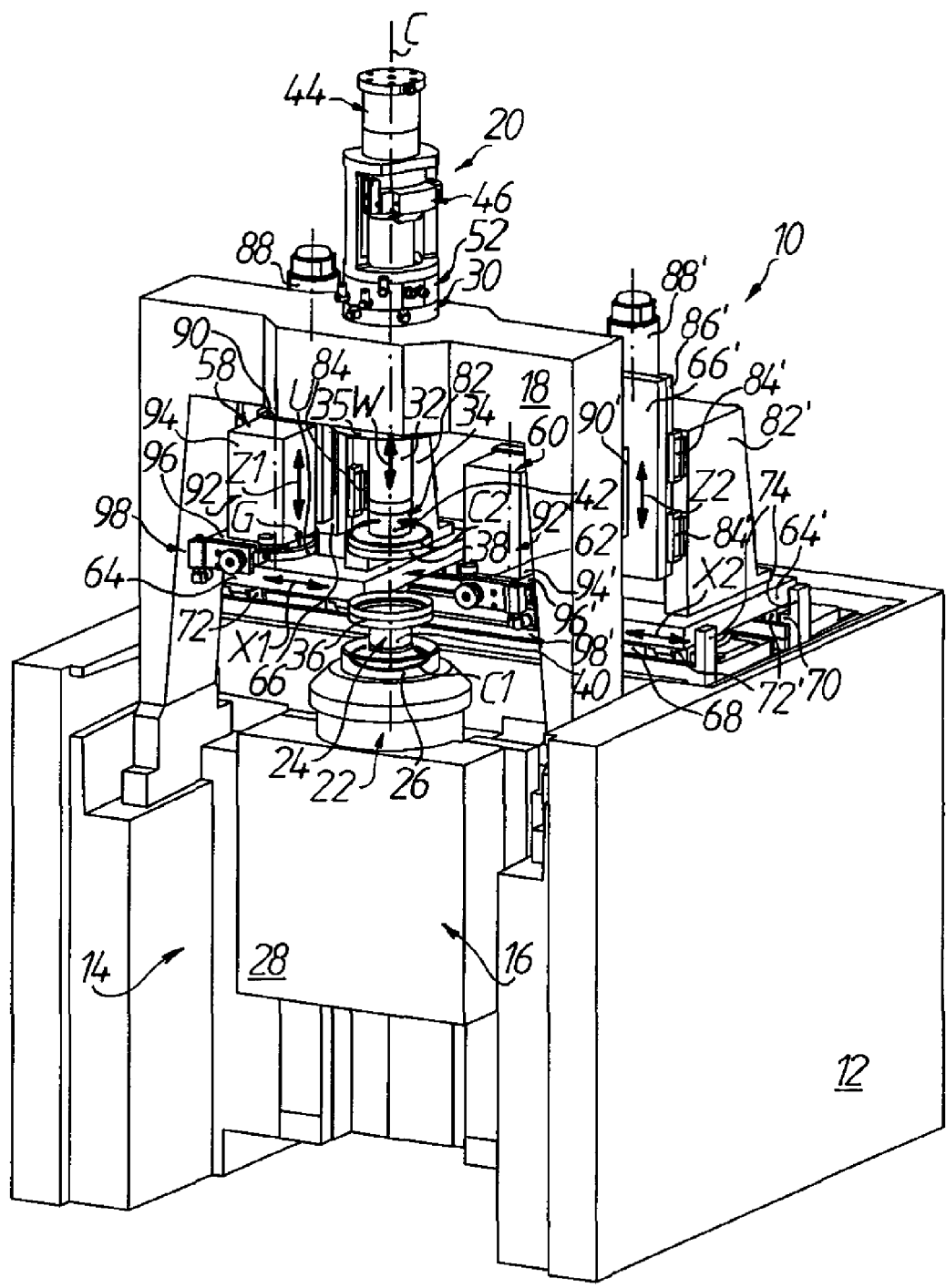
FIG. 1 shows a perspective view of a centering machine according to the invention for, in particular, optical lenses as workpieces, obliquely from above and front right.

A CNC-controlled centering machine for workpieces, particularly optical lenses L, is denoted in FIGS. 1 to 4 by 10. The centering machine 10 has a machine bed 12 of polymer-concrete, which has a receiving space 14 shown at the front in FIG. 1 for a lower centering spindle subassembly 16, which is fixedly mounted on the machine bed 12. A bridge-like portal frame 18 is erected in the receiving space 14 on the machine bed 12. The portal extends upwardly beyond the bed and carries, at a central location, an upper centering spindle subassembly 20, which will be described in more detail in the following with reference to FIGS. 5 to 12. The lower centering spindle subassembly 16 has a lower centering spindle 22 (referred to as a fixed spindle). The lower centering spindle shaft 24 is drivable by way of an internal runner torque motor (not shown) to rotate about a workpiece axis C1 of rotation but which is axially fixed. The lower centering spindle 22 is mounted by air bearings (not illustrated) and is received in a lower centering spindle housing 26, which in turn is fastened by a surrounding housing 28 to the machine bed 12.

As will be explained in more detail, in the first instance the upper centering spindle subassembly 20 has an upper centering spindle 30 (referred to as the clamping spindle) with an upper centering spindle housing 32. An upper centering spindle shaft 34 is drivable to rotate about a workpiece axis C2 of rotation and is mounted to be axially displaceable. The upper centering spindle 30 engages by its centering spindle housing 32 through a central opening in the portal frame 18, with which the centering spindle housing 32 is screw-connected from below by way of a mounting ring 35 (omitted in FIG. 9). The lower centering spindle shaft 24 and the upper centering spindle shaft 34 are so arranged that they are axially aligned with respect to a vertically extending centering axis C and are constructed at the mutually facing ends to each mount a clamping bell 36, 38, as is disclosed in German Norm DIN 58736-3 already mentioned in the introduction. The two centering spindle shafts 24, 34 are drivable independently of one another, with positional regulation in rotational angle, to rotate about the workpiece axes C1, C2 of rotation; synchronous running of the centering spindle shafts 24, 34 is achieved by CNC technology. For play-free and fixed mounting of the clamping bells 36, 38 each centering spindle shaft 24, 34 is provided at the end with a conventional hydro-expansion chuck 40, 42.

In addition, the upper centering spindle subassembly 20 according to, in particular, FIGS. 6 to 9 includes in general—in a sequence from above to below as seen in the figures; respectively described in more detail later—(i) a stroke device 44, by which the upper centering spindle shaft 34 is sensitively axially adjustable relative to the lower centering spindle shaft 24 along the centering axis C (positionally controlled clamping bell linear axis W) in order to align the optical lens L between the clamping bells 36, 38, (ii) a measuring system 46 for detecting the axial position and the angular position of the upper centering spindle shaft 34 relative to the upper centering spindle housing 32, (iii) a rotary drive 48, by which the upper centering spindle shaft 34, which is axially adjustable by way of the stroke device 44, is rotationally drivable, and (iv) a pneumatic clamping and counterbalancing device 50 combined in the illustrated embodiment, which serves, in particular, for application of a clamping force to the upper centering spindle shaft 34 in order to clamp the optical lens L aligned between the clamping bells 36, 38. An air bearing arrangement 52 has two air bearing sections 54, 56 for the upper centering spindle shaft 34. The rotary drive 48 and the clamping and counterbalancing device 50 lie axially between the air bearing sections 54, 56, with the feature that the stroke device 44, the rotary drive 48 and the clamping and counterbalancing device 50 are arranged coaxially with respect to the centering axis C.

As is further evident particularly from FIGS. 1 to 4, the centering machine 10 comprises two processing units 58, 60, which are movable relative to the centering axis C. Each unit 58, 60 has a respective grinding wheel G as a tool for edge processing of the optical lens L clamped between the clamping bells 36, 38. The two processing units 58, 60 are movable independently of one another in a work space 62. The work space 62 is bounded laterally and upwardly by the portal frame 18. The two centering spindles 22, 30 also project from below and above into the work space with the clamping bells 36, 38. Each processing unit, in particular, can move in a direction parallel to the centering axis C (positionally controlled tool linear axis Z1 or Z2) and in a direction perpendicularly thereto (positionally controlled tool linear axis X1 or X2). The movement mechanism has for that purpose two tilted cross-table arrangements, which are constructed and arranged in mirror symmetry with respect to a notional plane containing the centering axis C, each with a respective driven X slide 64 or 64' and a respective driven Z slide 66 or 66'.

More specifically, two guide rails 68, 70 similarly extending parallel to one another and serving for axial guidance of the two X slides 64, 64' are mounted on the machine bed 12 behind the portal frame 18 and parallel thereto, for which purpose each X slide 64, 64' is equipped with two pairs of guide carriages 72, 72', of which one pair engages one guide rail 68 and the other pair engages the other guide rail 70. A linear motor 76 (visible only for the X slide 64' on the right in FIGS. 1 and 2) having a respective magnet stator 78 mounted from above on the machine bed 12 and a respective coil runner 80 mounted from below on the respective X slide 64, 64', as can be best seen in FIG. 2 is provided for each linear drive of the X slides 64, 64', which are guided on the guide rails 68, 70 that are provided with rubber-buffered end abutments 74.

A bracket 82, 82' at which the respective Z slide 66, 66' is guided is screw-connected from above on each X slide 64, 64'. For this purpose two pairs of guide carriages 84, 84', which engage guide rails 86, 86' mounted in pairs parallel to one another on each Z slide 66, 66', are mounted on the respective bracket 82, 82' on the end face, which faces the portal frame 18, in parallel arrangement. A respective servomotor 88, 88' is flange-mounted from above on the respective bracket 82, 82' and drives a threaded spindle (not shown), which engages a threaded nut (similarly not illustrated). The respective servomotor 88, 88' provides for the linear drive of each of the Z slides 66, 66'. A spindle block 90, 90', on which a grinding spindle 92, 92' of the respective processing unit 58, 60 is mounted by its grinding spindle housing 94, 94', is mounted on each Z slide 66, 66' to face the portal frame 18. Each grinding spindle 92, 92' conventionally includes an electric rotary drive (not shown in more detail) for the respective grinding wheel G.

Figure 2:
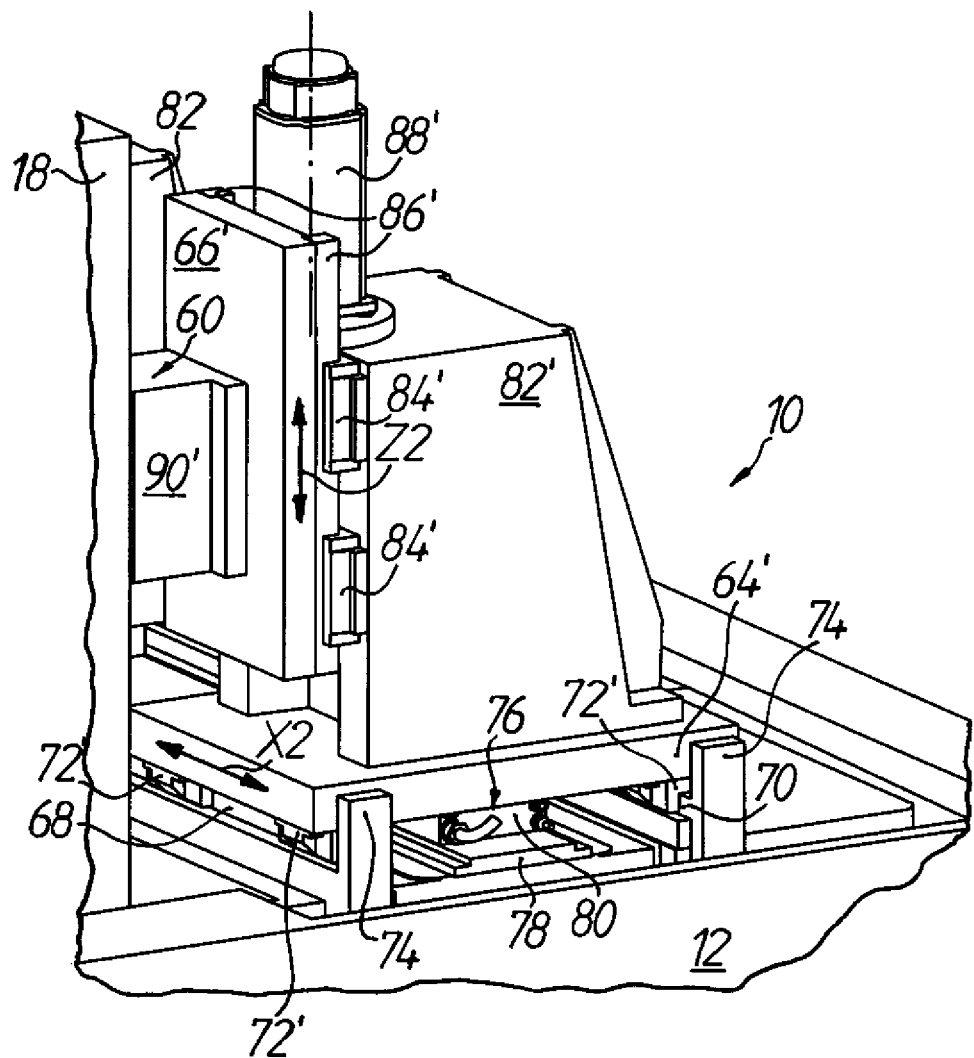
FIG. 2 shows a broken-away perspective view, which is enlarged in scale relative to FIG. 1, of the centering machine according to FIG. 1, obliquely from above and laterally from the right.
Figure 3:
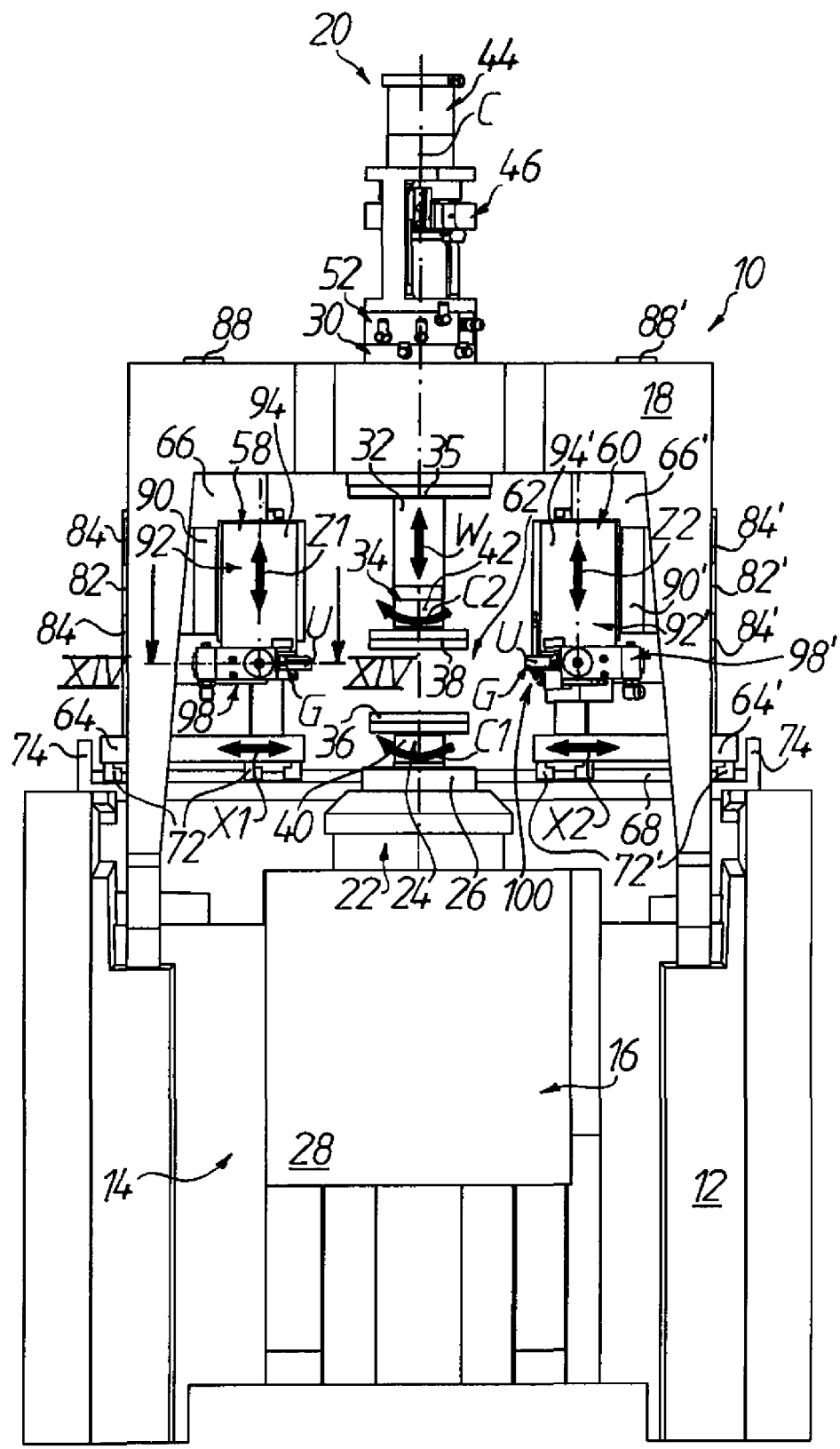
FIG. 3 shows a front view of the centering machine according FIG. 1.
Figure 4:
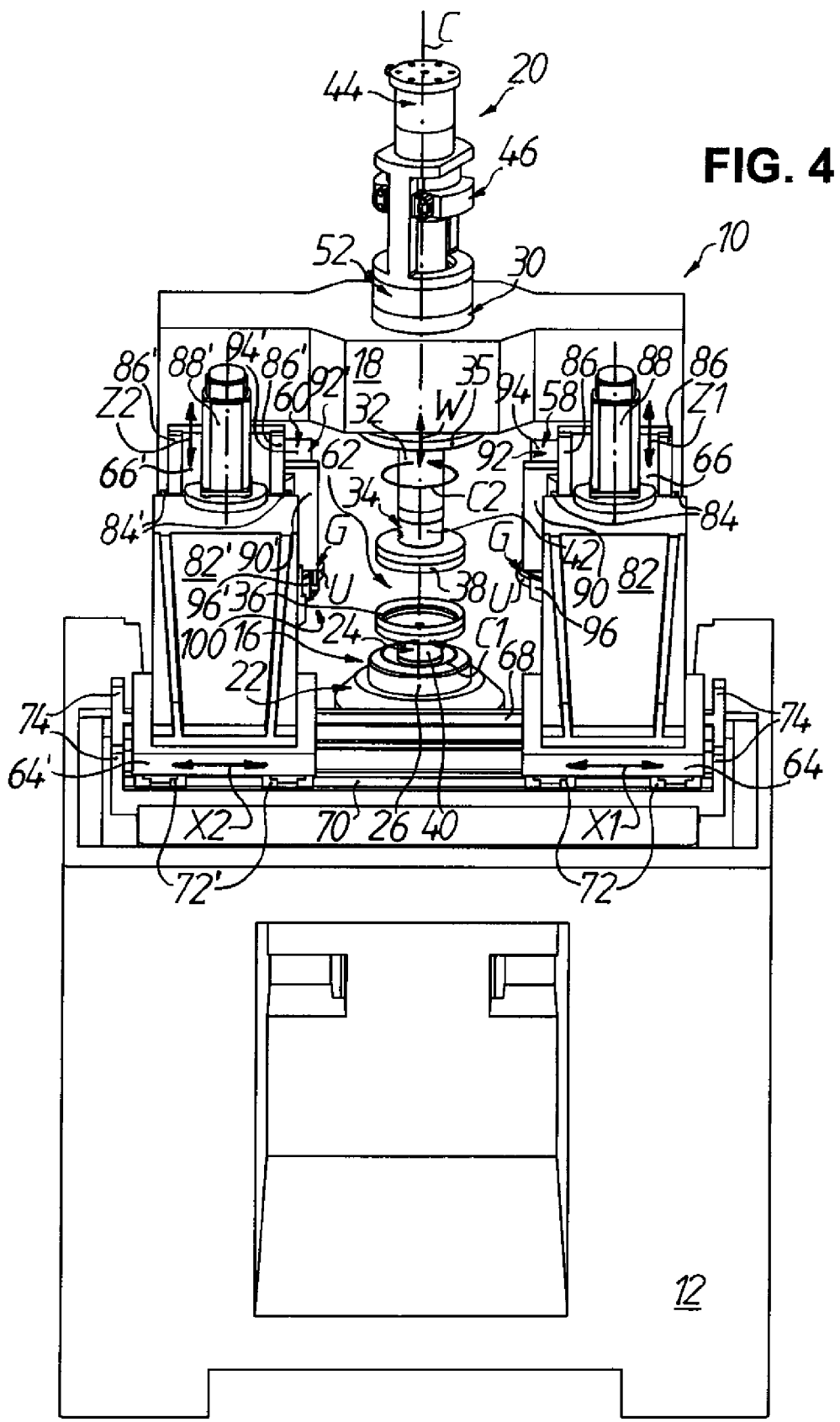
FIG. 4 shows a perspective view of the centering machine according to FIG. 1, obliquely from above and behind.

Finally, there can also be seen in FIGS. 1, 3 and 4 a spray protection device 96, 96' which is mounted on each grinding spindle housing 94, 94' and which surrounds the respective grinding wheel G up to a region of action for edge processing of the optical lens L. A cooling lubricant supply device 98, 98' is mounted on the respective grinding spindle housing 94, 94' by way of the spray protection device 96, 96' and is described in more detail in the following with reference to FIGS. 13 to 16. In addition, parts of an axial run-out measuring device 100 for checking the centering can additionally be seen in FIGS. 3 and 4. The measuring device 100 is flange-mounted at the processing unit 60 from below on the spindle block 90' and is explained in more detail later with reference to FIGS. 17 to 19.

Figure 5:
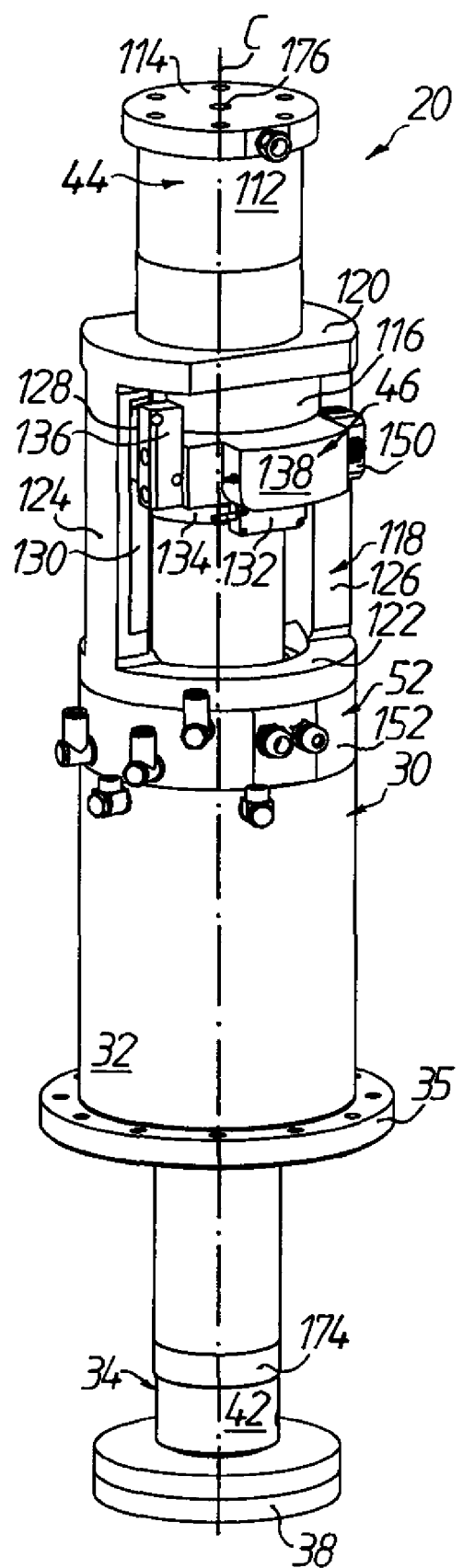
FIG. 5 shows a perspective view of an upper centering spindle subassembly of the centering machine according to FIG. 1 in an illustration isolated from the rest of the centering machine, with a clamping bell which is mounted on a centering spindle shaft mounting in a centering spindle housing.
Figure 6:
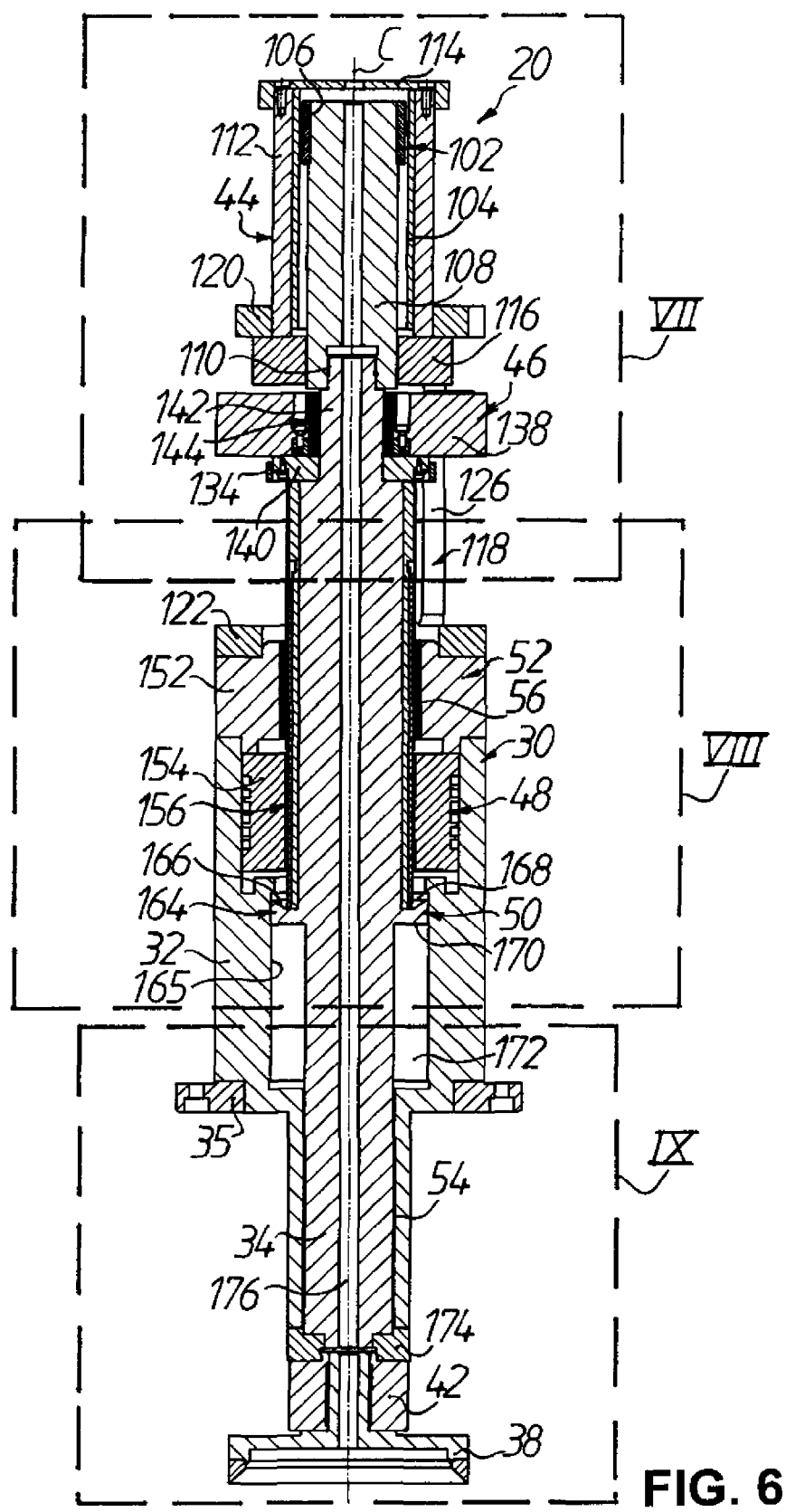
FIG. 6 shows a longitudinal sectional view of the upper centering spindle subassembly according to FIG. 5.
Figure 7:
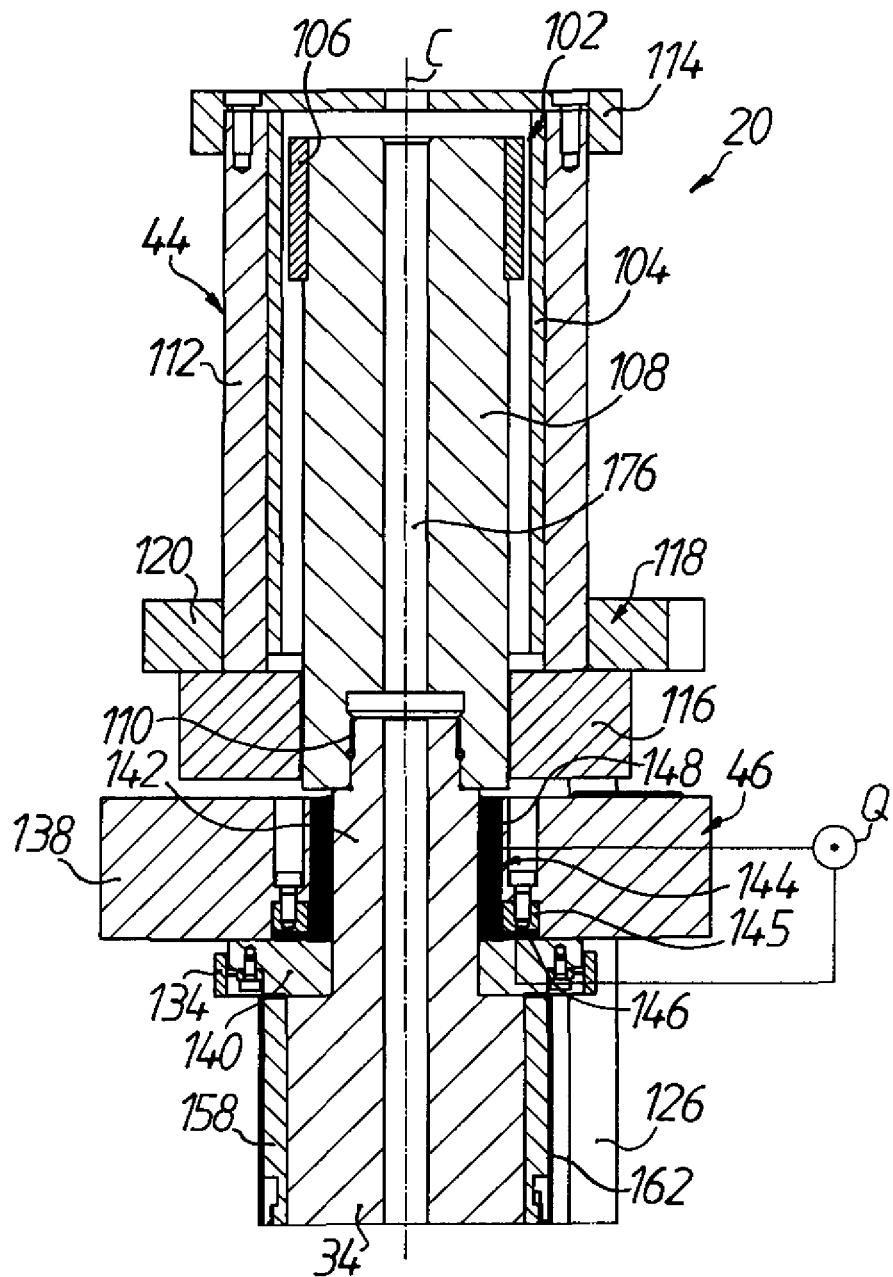
FIG. 7 shows an enlarged illustration of the detail VII in FIG. 6 showing, in particular, an electrical stroke device for the centering spindle shaft, with additionally indicated compressed air supply for an air bearing arrangement for mounting a measuring head on the centering spindle shaft.

Further details of the above centering spindle subassembly 20 can be seen in FIGS. 5 to 9. As illustrated in FIGS. 6 and 7, the stroke device 44 has a plunger coil drive 102, which is operatively connected with the axially adjustable upper centering spindle shaft 34 and which includes one or more coils 104 coaxial with respect to the centering axis C and at least one permanent magnet 106 co-operating with the coil 104. Whereas the permanent magnet 106 is fastened to a rotor part 108, which is fixedly connected with the axially adjustable centering spindle shaft 34 by way of a screw-connection section 110 so that it can rotate together with the upper centering spindle shaft 34, the coil 104 surrounding the permanent magnet 106 is mounted in a plunger coil drive housing 112 which is in fixed position in the machine and which in turn surrounds the coil 104. In FIG. 7, the substantially hollow-cylindrical plunger coil drive housing 112 is connected upwardly with a housing cover 114 fixedly screw-connected with the housing. An annular flange plate 116 is screw-connected from below in FIG. 7 with the plunger coil drive housing 112, through which the rotor part 108 extends. The screws are not illustrated.

The plunger coil drive housing 112 together with the coil 104, the housing cover 114 and the flange plate 116 is supported relative to the upper centering spindle housing 32 by way of a drive holder 118, which can be best seen in FIG. 5. The drive holder 118 has an upper annular disc 120 and a lower annular disc 122, which are connected together by way of two webs 124, 126 which extend parallel to the centering axis C and are diametrically opposite one another with respect to the centering axis C. The plunger coil drive housing 112 extends through the upper annular disc 120 of the drive holder 118 and is fixedly connected therewith by way of the flange plate 116, which is flange-mounted from below on the upper annular disc 120 by screws (similarly not illustrated).

The measuring system 46 for detecting the axial and angular positions of the upper centering spindle shaft 34 is received in the free space between the annular discs 120, 122 and the webs 124, 126 of the drive holder 118. As illustrated in FIG. 5, the measuring system 46 has an axial measuring head 128, which co-operates in a manner known per se with a measuring band 130 in order to detect the axial position of the upper centering spindle shaft 34 with respect to the centering spindle housing 32, and an angle measuring head 132, which co-operates in a manner known per se with a measuring ring 134 (see FIGS. 6 and 7) in order to detect the angular position of the upper centering spindle shaft 34 about the centering axis C.

Whereas the measuring band 130 is fastened to the web 124, which as shown in FIG. 5, is on the left of the drive holder 118, and almost completely bridges over the free space between the annular discs 120, 122 of the drive holder 118, the axial measuring head 128 is mounted on a measuring head support 138 by way of a measuring head adapter 136. The angle measuring head 132 is also fastened to the measuring head support 138. The measuring ring 134, as illustrated in FIGS. 6 and 7, is mounted on a measuring ring support 140 which is connected, to be secure against rotation, with the upper centering spindle shaft 34 at an upper projection 142 of shaft 34.

The measuring head support 138 is mounted relative to the upper centering spindle shaft 34 by way of a combined axial/radial air bearing arrangement 144. As illustrated in FIG. 7, the bearing arrangement has an annular porous axial bearing pad 146 at a bearing ring 145 screw-connected with the measuring head carrier 138 and a porous radial bearing bush 148 at the inner circumference of the measuring head support 138. As is also shown in FIG. 7, the axial bearing pad 146 and the radial bearing bush 148 of the axial/radial air bearing arrangement 144 are connected with a compressed air source Q. The axial bearing pad 146 mounts the measuring head support 138 relative to the measuring ring support 140, and the radial bearing bush 148 mounts the measuring head support 138 on the upper projection 142 of the centering spindle shaft 34. Finally, an air-mounted anti-twist securing device 150 rotationally supports the measuring head support 138 at the web 126 of the drive holder 118 at the right in FIG. 5.

It is evident that the measuring head carrier 138 together with the upper centering spindle shaft 34 can move with very easy motion in axial direction relative to the centering spindle housing 32 which is in a fixed position in the machine. As a consequence of its torque support relative to the drive holder 118 it does not accompany and also does not obstruct the rotational movement of the centering spindle shaft 34. To that extent the measuring system 46 allows a very precise and sensitive detection of the axial and angular positions of the upper centering spindle shaft 34 with respect to the centering spindle housing 32.

Figure 8:
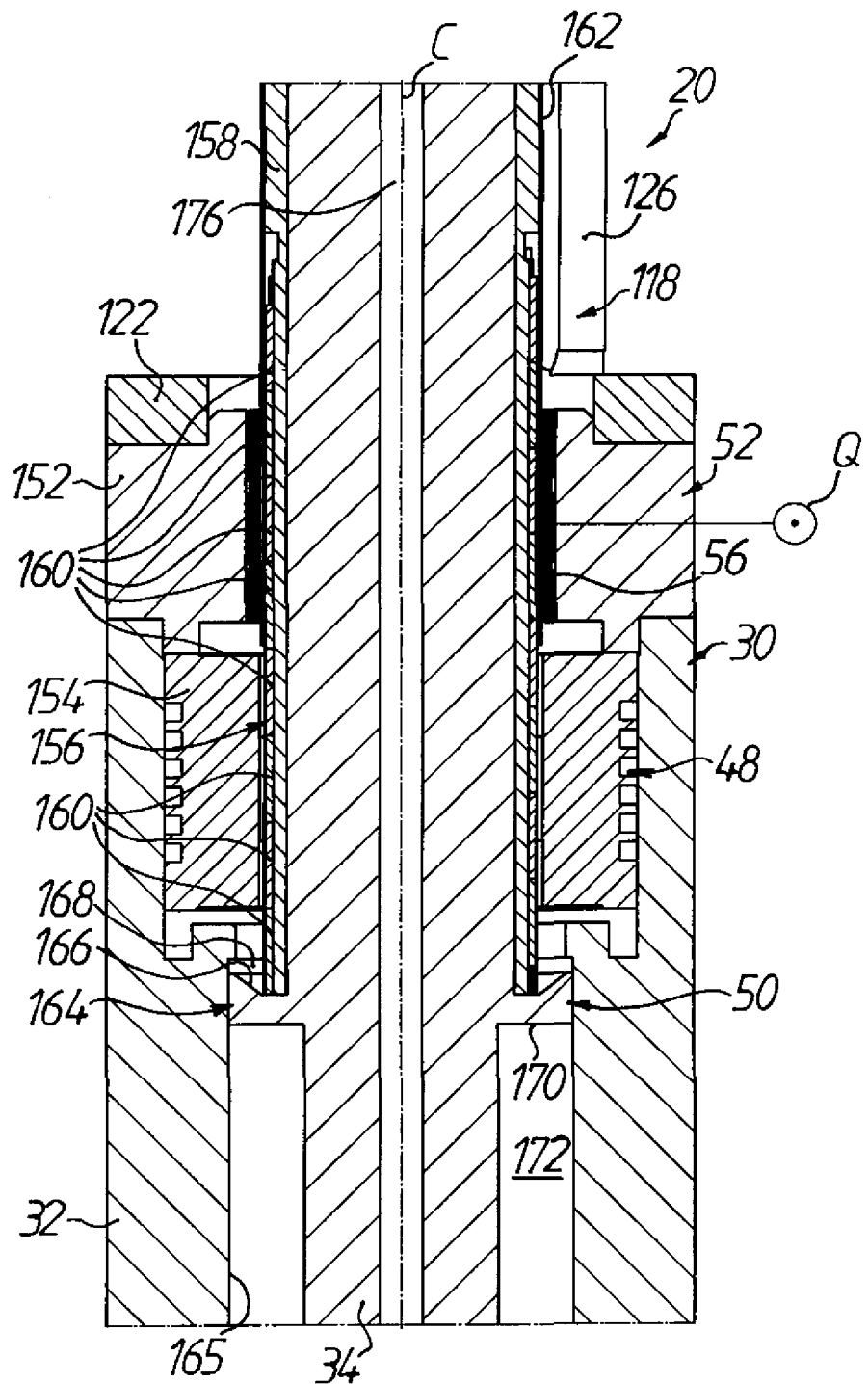
FIG. 8 shows an enlarged illustration of the detail VIII in FIG. 6 showing, in particular, an electrical rotary drive and a combined pneumatic clamping and counterbalancing device for the centering spindle shaft, with additionally, an indicated compressed air supply for an upper air bearing section of an air bearing arrangement for mounting the centering spindle shaft in the centering spindle housing.
Figure 9:
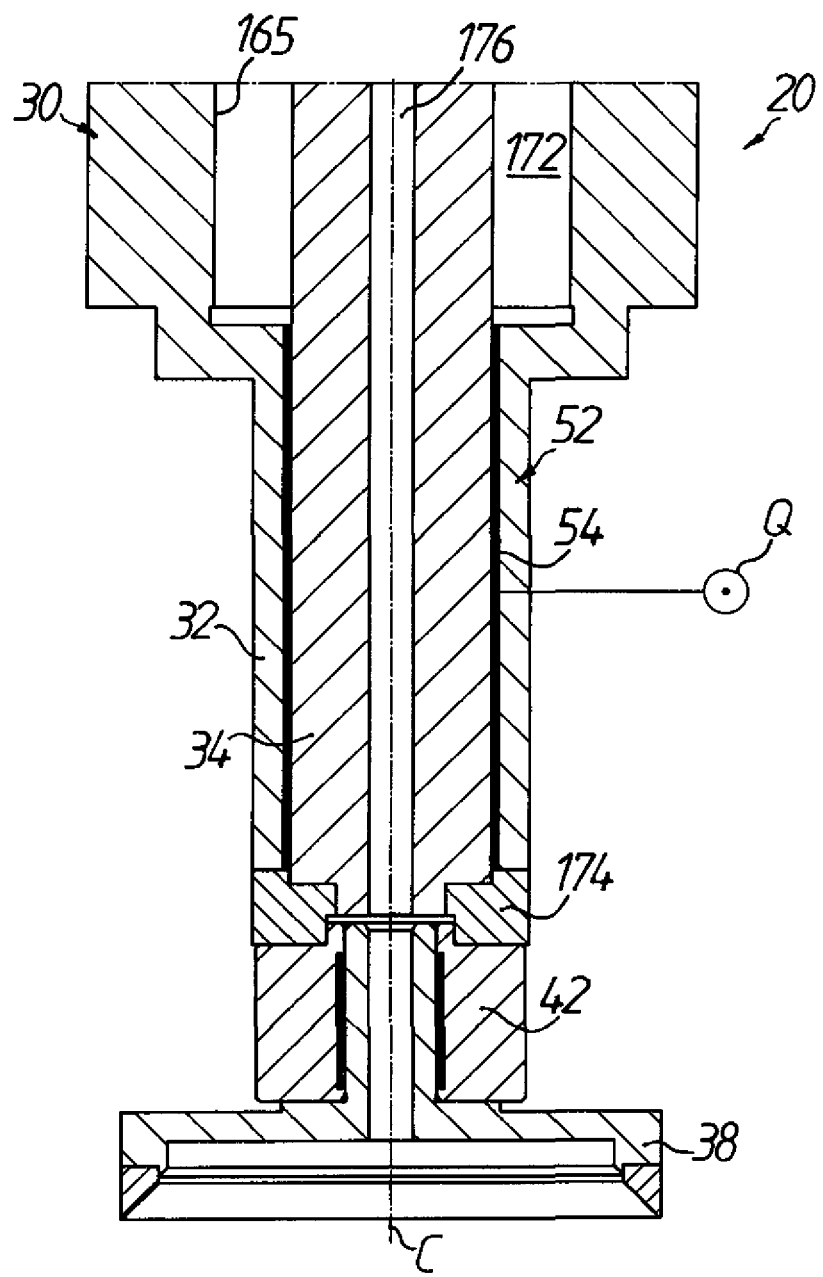
FIG. 9 shows an enlarged illustration of the detail IX in FIG. 6 showing, in particular, the clamping bell mounting on the centering spindle shaft, with additionally, an indicated compressed air supply for a lower air bearing section of the air bearing arrangement for mounting the centering spindle shaft in the centering spindle housing.

As illustrated in FIGS. 5, 6 and 8, the drive holder 118 is flange-mounted by its lower annular disc 122 on an annular bearing flange 152, which in turn is screw-connected with the centering spindle housing 32 (the screws again are not shown). The upper air bearing section 56, which is connected with the compressed air source Q, of the air bearing arrangement 52 for the centering spindle shaft 34 is fastened in the form of a porous radial bearing bush at the inner circumference of the bearing flange 152. The lower air bearing section 54 of the air bearing arrangement 52, which is similarly connected with the compressed air source Q, is best illustrated in FIG. 9. This, too, is a porous radial bearing bush, which is mounted in a narrowed, lower section of the centering spindle housing 32. Accordingly, the axially adjustable upper centering spindle shaft 34 is so mounted in the centering spindle housing 32 by the air bearing arrangement 52 that it is axially displaceable and rotatable relative to the centering spindle housing 32 with very easy motion. As already indicated further above, the rotary drive 48 for that and also the clamping and counterbalancing device 50 acting at the centering spindle shaft 34 are received in coaxial aligned arrangement between the air bearing sections 54, 56 in the centering spindle housing 32.

The rotary drive 48 is an internal rotor torque motor, with a winding stator 154 mounted in the centering spindle housing 32 and a rotor 156. The rotor 156 is always surrounded by the stator 154 and is secured at the outer circumference of the axially adjustable upper centering spindle shaft 34 and which is significantly longer in axial direction than the stator 154 and is axially displaceable relative to the stator 154 together with the centering spindle shaft 34. As shown in FIG. 8, the rotor 156 has a rotor sleeve 158, which is secured on the centering spindle shaft 34 and which in turn carries at its outer circumference the magnets 160 of the rotary drive 48, which are cast in place together with the rotor sleeve 158 by a plastic material or synthetic resin. The rotor sleeve 158 or the magnets 160 is or are additionally fixedly surrounded by a thin bearing sleeve 162 of the rotor 156 axially in the region of the upper air bearing section 56 of the air bearing arrangement 52.

The clamping and counterbalancing device 50 is arranged in the centering spindle housing 32 below the rotary drive 48. As clearly shown in FIGS. 6 and 8, the clamping and counterbalancing device 50 includes an annular piston 164 which is of unsealed construction and which is mounted at the outer circumference of the axially adjustable centering spindle shaft 45 directly below the rotor 156 of the rotary drive 48. The piston 164 leaves only a small annular gap (not able to be seen in the figures) to a cylinder wall 165 in the centering spindle housing 32. The annular piston 164 forms on its side remote from the clamping bell end of the upper centering spindle shaft 34 an annular effective surface 166 which is located in the centering spindle housing 32 adjacent to the stator 154 of the rotary drive 48. The surface 166 defines, in part, an annular chamber 168 by way of which the annular piston 164 can be acted on pneumatically in order to generate the clamping force acting from below in the figures. On its side facing the clamping bell end of the upper centering spindle shaft 34 the annular piston 164 forms a further annular effective surface 170 which is larger than the effective surface 166 for clamping and located in the centering spindle housing 32. The surface 170 defines, in part, a further annular chamber 172 by way of which the annular piston 164 can be acted on pneumatically in order to ensure, at the upper centering spindle shaft 34, a pneumatic weight compensation with a force direction upwards in the figures. The compressed air supply for the annular chambers 168 and 172 of the clamping and counterbalancing device 50 is shown merely schematically in FIGS. 10 to 12 (compressed air source Q, servo pressure regulating valves V1, V2). Manometers, which are similarly schematically shown, here serve to signal which annular chamber 168 or 172 is acted on pneumatically in the bell clamping process.

FIG. 9 illustrates the clamping bell end, which is lower the upper centering spindle shaft 34 as shown in FIG. 6. The clamping bell 38 and the hydro-expansion chuck 42 for mounting the clamping bell 38 are conventional in nature, so that these parts do not need further explanation. The hydro-expansion chuck 42 is fixedly connected with the centering spindle shaft 34 by way of a connecting ring 174 with a labyrinth seal with respect to the centering spindle housing 32. As shown in FIGS. 5 to 12, a passage bore 176 extends from the housing cover 114 of the plunger coil drive housing 112 to the clamping bell 38 and enables, in a manner known per se, optional use of a laser centering device (not shown).

Figure 10:
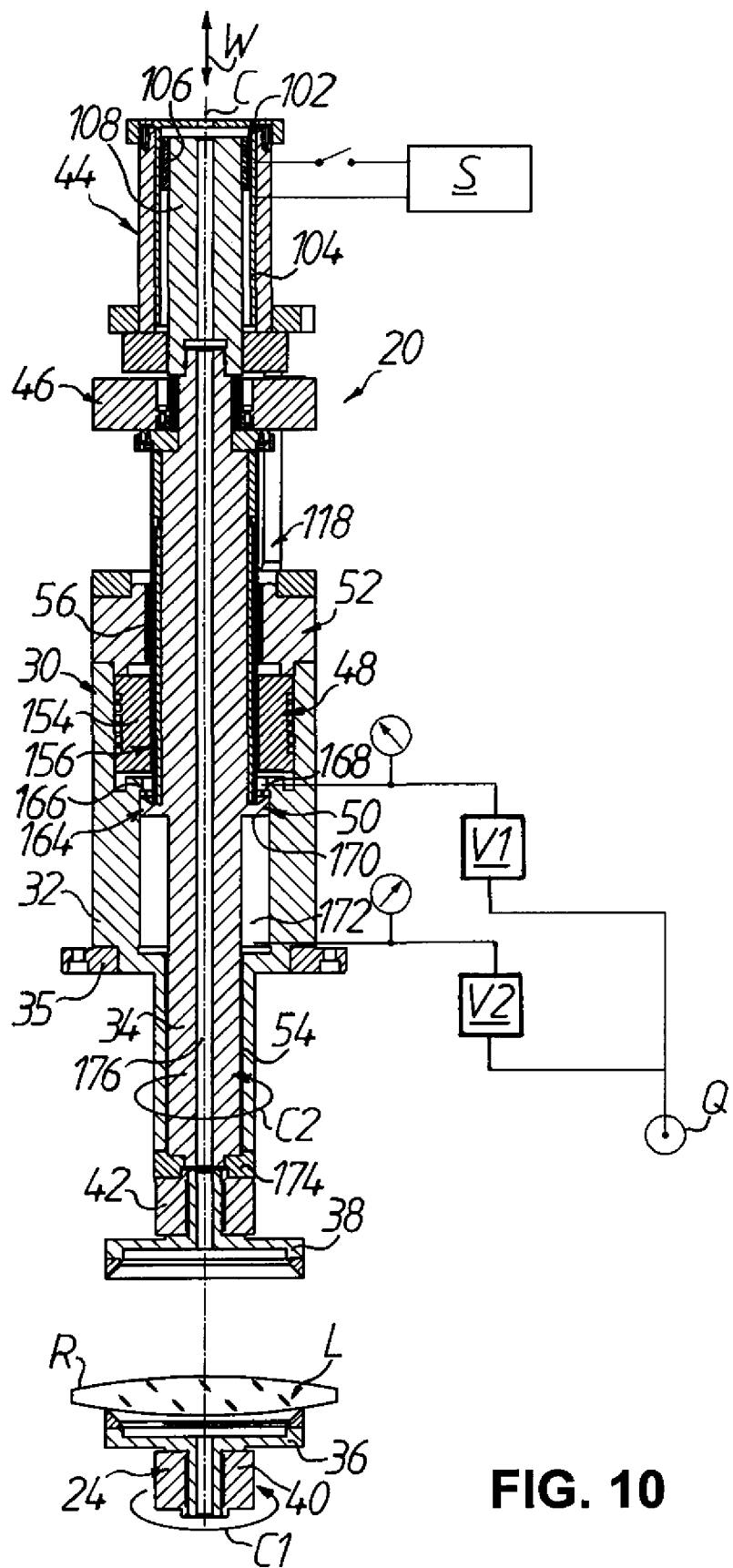
FIG. 10 shows a longitudinal sectional view of the upper centering spindle subassembly according to FIG. 5, with an indicated power supply for the stroke device and compressed air supply/valve arrangement for the combined pneumatic clamping and counterbalancing device, in a state after counterbalancing has been carried out in preparation for a bell clamping process.
Figure 11:
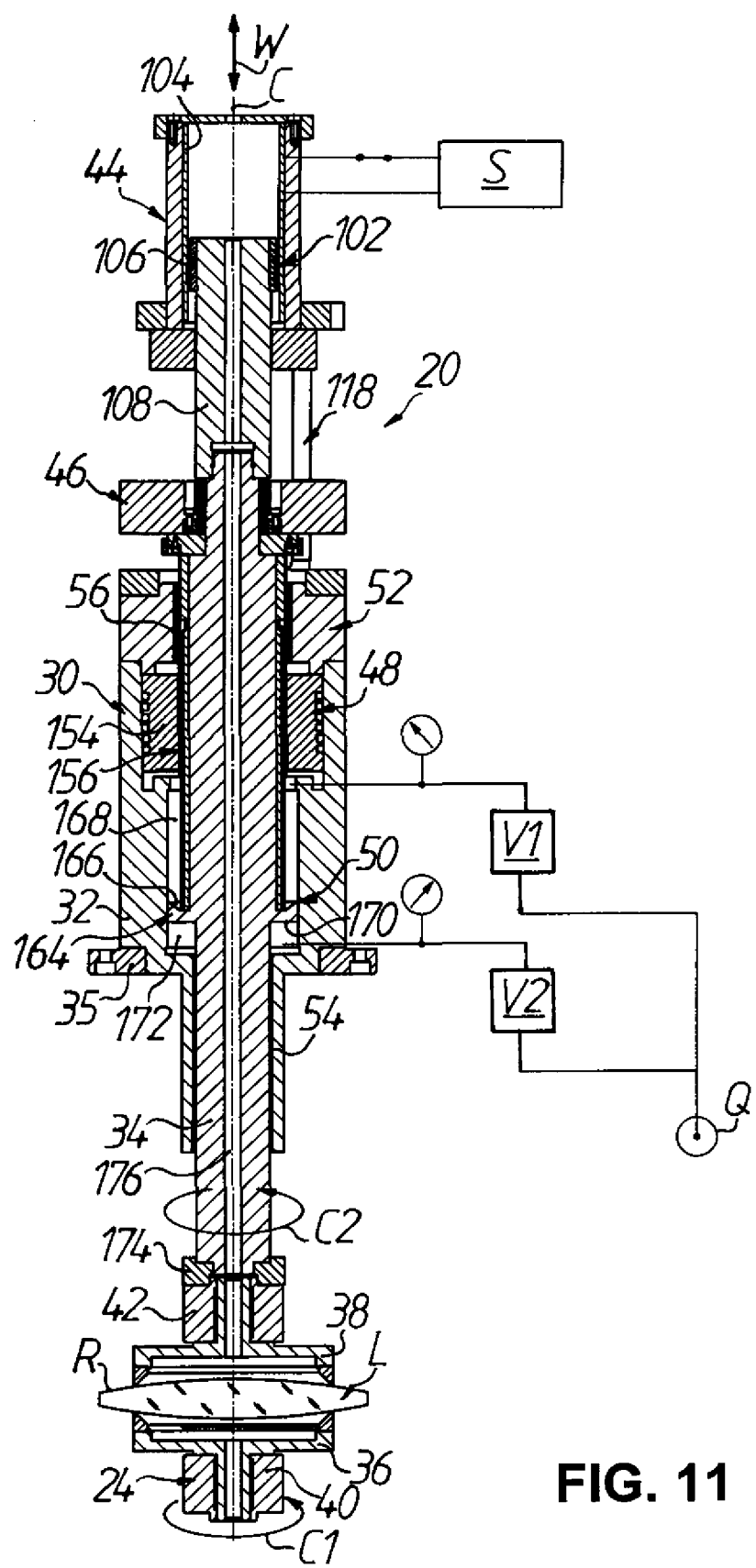
FIG. 11 shows a longitudinal section, which is similar to FIG. 10, of the upper centering spindle subassembly according to FIG. 5, with a clamping bell, which after the contacting phase of the bell clamping process has been lowered on an optical line, during the alignment phase of the bell clamping process.
Figure 12:
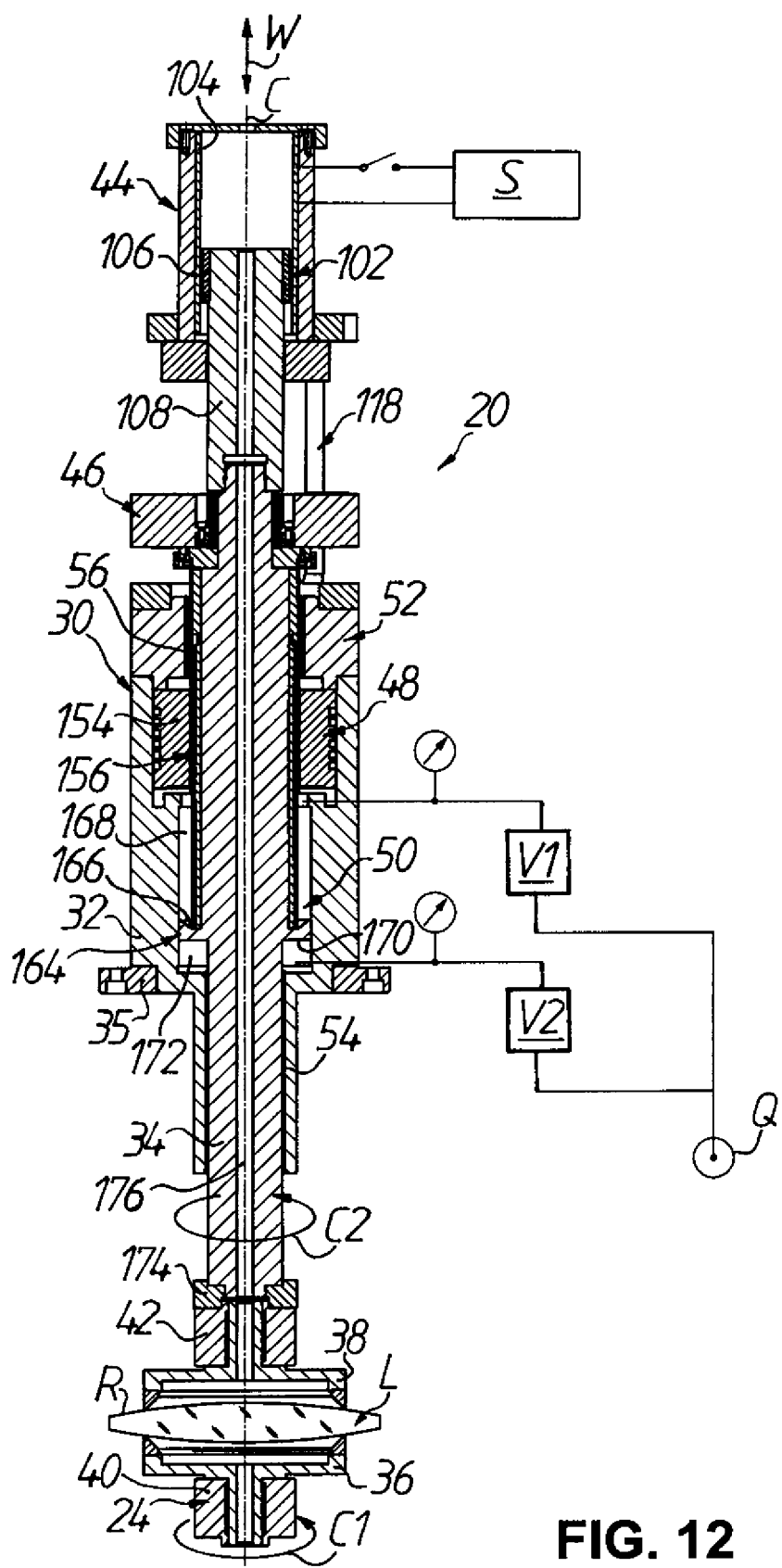
FIG. 12 shows a longitudinal sectional view, which is similar to FIGS. 10 and 11, of the upper centering spindle subassembly according to FIG. 5, in a state during the clamping phase of the bell clamping process.

The sequence of a bell clamping process shall now be briefly explained by way of FIGS. 10 to 12, in which of the lower centering spindle or the centering spindle shaft 24 thereof only the hydro-expansion chuck 40, which is retained thereat, with the lower clamping belt 36 is shown.

For sensitive adjustment of the clamping bell 38 by way of the upper centering spindle shaft 34, initial compensation is to be provided for the combined weight of the centering spindle shaft 34 together with the respective clamping bell 38 mounted thereon and all parts conjunctively axially moved along the centering axis C, including the hydro-expansion chuck 42, connecting ring 174, annular piston 164 of the clamping and counterbalancing device 50, rotor 156 of the rotary drive 48, measuring ring support 140 and measuring head support 138 with the components, which are mounted thereon, of the measuring system 46, rotor part 108 and permanent magnet 106 of the stroke device 44. For this purpose, the annular chamber 172 of the clamping and counterbalancing device 50 is acted on by way of the servo pressure regulating valve V2 by a sensitively controlled fluid pressure which acts on the lower effective surface 170 of the annular piston 164 so that this lifts the mentioned components. The fluid pressure when the plunger coil drive 102 is switched off is so controlled that the centering spindle shaft 34 no longer executes a vertical movement and is held in suspension. In these circumstances, the vertical movement is detected by the measuring system 46 integrated in the centering spindle subassembly 20, in which case a preselected threshold value of residual speed of the vertical movement limits this regulating process. The fluid pressure now controlled in the lower annular chamber 172 by way of the servo pressure regulating valve V2 is kept constant for the further process. The initial state after weight compensation has taken place is illustrated in FIG. 10.

The contacting phase of the bell clamping process can now begin, in which the upper clamping bell 38 is moved in direction towards the lower clamping bell 36 in order to come into contact with the lens L placed on the lower clamping bell. For this purpose, the plunger coil drive 102 of the stroke device 44 is supplied with current by way of the current regulator S in order to lower the upper clamping bell 38 by a sensitively controllable force and clearly defined travel until the upper clamping bell 38 rests on the lens L (end of contacting phase).

The centering spindle shafts 24, 34 can then be rotationally driven about the centering axis C, whereby the lens L easily slips into position, optionally with addition of a slip-promoting agent. Its two radial surfaces then bear against the cup edges of the clamping bells 36, 38. This state is illustrated in FIG. 11 and defines the end of the alignment phase.

After the lens L has thus been aligned with respect to the optical axis thereof, the plunger coil drive 102 of the stroke device 44 according to FIG. 12 is switched off again for the clamping phase of the bell clamping process. At the same time, the clamping force is increased in defined manner by pressure-loading of the upper annular chamber 168 of the clamping and counterbalancing device 50 and thus of the upper effective surface 166 of the annular piston 164 by way of the servo pressure regulating valve V1 to such an extent that the lens L is securely clamped in place for the edge grinding process, which can now take place with the help of the processing units 58, 60.

It is evident that as a consequence of the coaxial arrangement of the actuators (stroke device 44, rotary drive 48, clamping and counterbalancing device 50) acting on the upper centering spindle shaft 34 there is no generation of transverse forces that risk the axial alignment of the centering spindle shafts 24, 34, during the bell clamping process.

The actual edge processing—in which the edge of the lens L clamped between the clamping bells 36, 38 is ground by the rotationally driven grinding wheels G at the grinding spindles 92, 92' of the processing units 58, 60, while the grinding spindles 92, 92' are moved, with CNC positional regulation, in the linear axes X1, X2 and optionally Z1, Z2 in correspondence with the profile to be ground at the lens L—does not need to be explained in more detail at this point, because it is familiar to one ordinarily skilled in the art.

As already mentioned further above with reference to FIGS. 1, 3 and 4, a cooling lubricant supply device 98, 98' for the respective grinding wheel G is provided at each processing unit 58, 60. The grinding device 98 for the processing unit 58 at the left in FIG. 1 will be explained in more detail in the following by way of FIGS. 13 to 16. The cooling lubricant supply device 98' at the processing unit 60 on the right in FIG. 1 is constructed with mirror-symmetry with respect to the lefthand cooling lubricant supply device 98 and therefore does not need to be specifically described.

Figure 14:
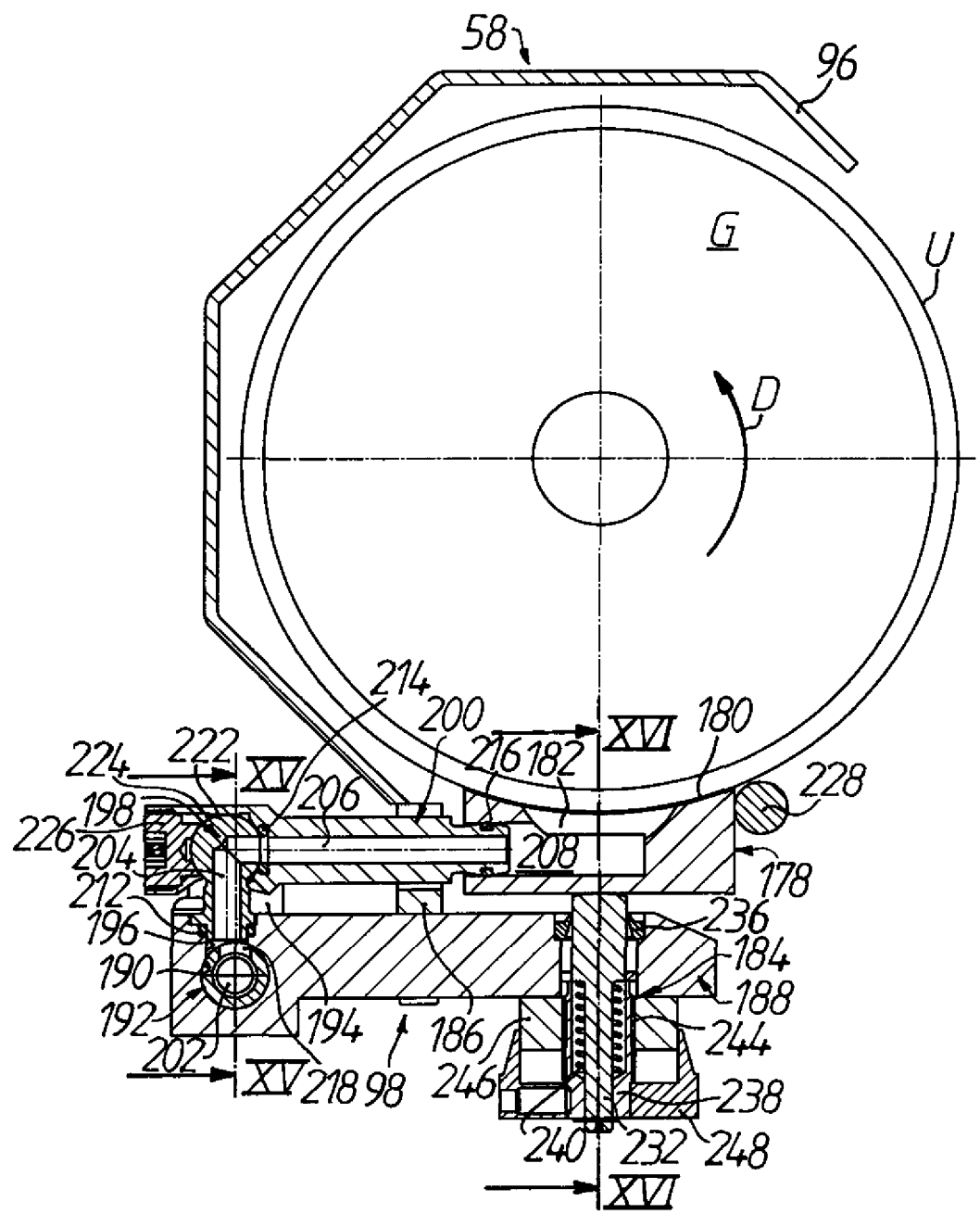
FIG. 14 shows an enlarged sectional view particularly of the cooling lubricant supply device according to FIG. 13 in correspondence with the section line XIV-XIV shown in FIGS. 3 and 13.
Figure 15:
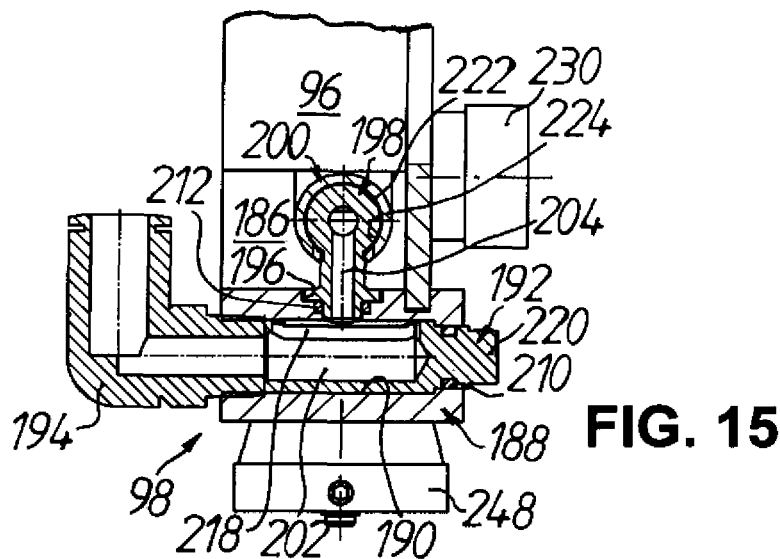
FIG. 15 shows an enlarged sectional view of the cooling lubricant supply device according to FIG. 13 in correspondence with the section line XV-XV shown in FIG. 14.
Figure 16:
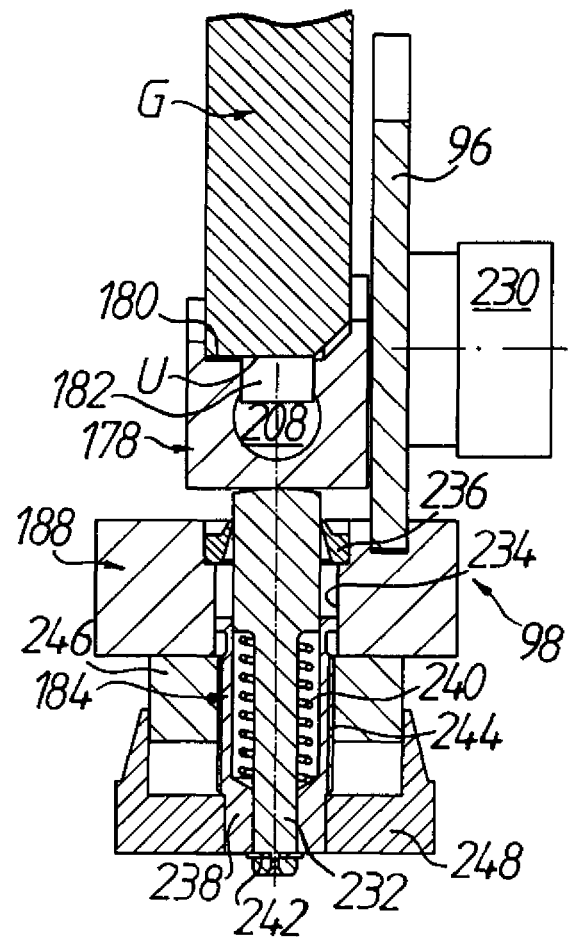
FIG. 16 shows an enlarged sectional view of the cooling lubricant supply device according to FIG. 13 in correspondence with the section line XVI-XVI in FIG. 14.

Referring now to FIGS. 14 and 16, the cooling lubricant supply device 98 generally includes a feed shoe 178, which is mounted in a manner indirectly on the grinding spindle housing 94 and seated on a circumferential surface U of the grinding wheel G and which is made of a machinable material, preferably plastic material. The feed shoe 178 has a seating surface 180, which faces the grinding wheel G and which has a shape substantially complementary with the circumferential surface U of the grinding wheel G, for which purpose the seating surface 180 is preferably formed at the feed shoe 178 by the grinding wheel G as a negative contour of the circumferential surface U of the grinding wheel G. The feed shoe 178 is provided substantially centrally with a pocket-like recess 182 into which the cooling lubricant can be fed under pressure. In addition, a spring mechanism 184 is provided to bias the feed shoe 178 to have its seating surface 180 abut against the circumferential surface U of the grinding wheel G, wherein in the illustrated embodiment the biasing force of the spring mechanism 184 can be set.

Figure 13:
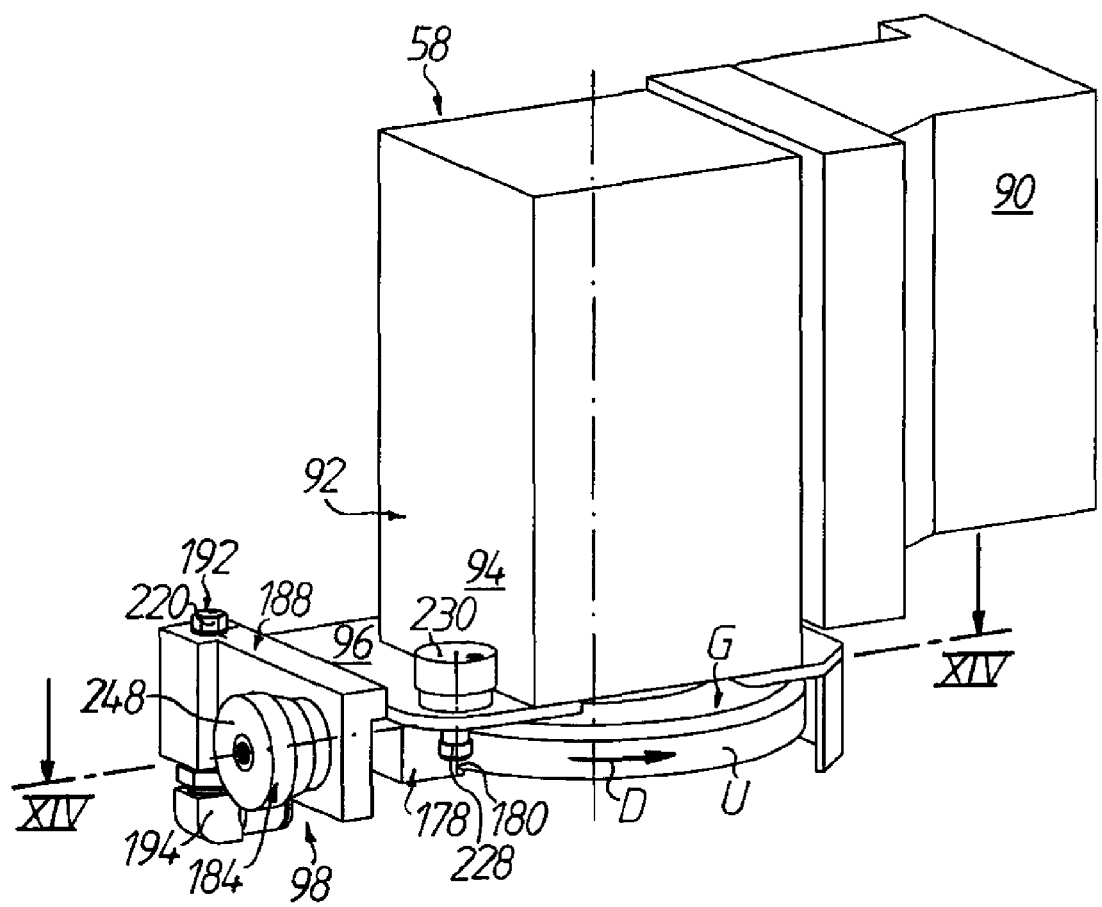
FIG. 13 shows a perspective view of a processing unit, which has, on the left in FIGS. 1 and 3, a grinding spindle with a grinding wheel rotatably mounted thereon, of the centering machine according to FIG. 1 in an illustration isolated from the rest of the centering machine, for illustration of a cooling lubricant supply device for the feed of a cooling lubricant to the grinding wheel.

According to FIGS. 13 and 14 the cooling lubricant supply device 98 is mounted on the spray protection device 96, which in turn is secured to the grinding spindle housing 94. For this purpose, the spray protection device 96 has a protrusion 186 (see FIG. 14), which carries a mount 188 of the cooling lubricant supply device 98. In FIG. 14 the mount 188 is provided on the left with a stepped passage bore 190 for reception of a control slide valve 192, with which, according to FIG. 15, an L push-in screw coupling 194 for supply with the cooling lubricant is connected. A stepped transverse bore 196 opens from above in FIGS. 14 and 15 into the passage bore 190, in which a suspension element 198 for a shoe holder 200 is fastened, which in turn carries the feed shoe 178. Connecting bores 202, 204, 206, 208 in the control slide valve 192, suspension element 198, shoe holder 200 and feed shoe 178, respectively, ensure a fluid connection between the L push-in screw coupling 194 and the recess 182 in the feed shoe 178, in which case O-rings 210, 212, 214, 216 provide sealing relative to the environment. The inflow quantity of the cooling lubricant can in that case be controlled by way of a control slide valve opening 218, in that the control slide valve 192 is rotated in the passage bore 190 of the mount 188 by way of a handle 220 at the control slide valve 192.

According to, in particular, FIG. 14 the suspension element 198 is provided at its end remote from the control slide valve 192 with a ball head 222 which is seated in an associated seat 224 in the shoe holder 200 and is secured by a setscrew 226. The ball head 222 and the seat 224 thus form a joint, which lies in front of the feed shoe 178 as seen in the rotational direction D of the grinding wheel G and is fixed relative to the grinding spindle housing. The feed shoe 178 is pivotally connected by way of the substantially tubular shoe mount 200 so that the feed shoe 178 can be placed substantially tangentially against the circumferential surface U of the grinding wheel G. A lock 228 is mounted at the spray protection device 96 and can be removed by a handle 230 for change of the feed shoe 178. The lock 228 forms an abutment for the feed shoe 178 in the rotational direction D of the grinding wheel G which prevents the feed shoe 178 from being torn away from the grinding wheel G.

Further details of the spring mechanism 184 mounted in FIG. 14 on the right on the mount 188 are illustrated in FIG. 16. In the first instance, the spring mechanism 184 has an abutment pin 232 by way of which a force can be exerted on the feed shoe 178 in direction towards the grinding wheel G and which engages through a stepped passage bore 234 in the mount 188. A lip ring 236 is mounted in the passage bore 234, in the region of the end of the abutment pin 232 protruding beyond the feed shoe 178 in direction towards the grinding wheel G. The lip ring 236 ensures that the spring mechanism 184 is not otherwise contaminated.

The abutment pin 232 is guided in a threaded sleeve 238 to be axially displaceable. A helical compression spring 240 is provided radially between the abutment pin 232 and the threaded sleeve 238. The spring 240 is supported not only at a step of the threaded sleeve 238, but also at a step of the abutment pin 232 so that it forcibly urges the abutment pin 232 and the threaded sleeve 238 apart. In the operating state of the cooling lubricant supply device 98 the abutment pin 232 is, however, prevented by the feed shoe 178 from freely moving away from the threaded sleeve 238. For example, if the feed shoe 178 is removed for maintenance work, a securing ring 242 at the other end of the abutment pin 232 prevents the spring mechanism from falling apart.

The threaded sleeve 238 is axially guided at the inner circumference of the passage bore 234 by way of an annular web. The sleeve 238 has an external thread 244 by which the threaded sleeve 238 is screwed into a nut 246, which in turn is fixedly mounted on the mount 188. It is evident that through rotation of the threaded sleeve 238 by way of a setting wheel 248 mounted on the threaded sleeve 238 the biasing force of the helical compression spring 240 can be set in defined manner.

In operation of the cooling lubricant supply device 98 the feed of the cooling lubricant is initially switched on so that the latter is fed under pressure by way of the L push-in screw coupling 194, the suspension means 198 and the shoe holder 200 to the recess 182 in the feed shoe 178. The feed shoe 178 then functions as a hydrostatic slide bearing and slightly lifts off the circumferential surface U of the grinding wheel G. The bearing gap of this hydrostatic bearing is, as apparent, settable by way of the bias of the helical compression spring 240 in the spring mechanism 184. In testing of this cooling lubricant supply device 98 in practice the cooling lubricant was shown to still surround the grinding wheel G, when rotating at high rpm, over an angle of more than 90° after leaving the storage pocket or recess 182 and only later at greater angles was flung away from the grinding wheel G due to centrifugal forces. This unexpected effect makes it possible for the feed shoe 178 to be able to be positioned relatively far away from the point of action between grinding wheel G and workpiece L, which in turn provides significant advantages in (inter alia) workpiece handling. In addition, migration of the point of action between workpiece L and grinding wheel G due to a non-circular outer profile of the workpiece L no longer causes any problems in cooling or lubrication.

In a given case, for example, after the bell clamping process and before the actual edge processing, the centering of the lens L between the clamping bells 36, 38 can be checked by the axial run-out measuring device 100. As shown in FIG. 3, the measuring device 100 is integrated in the centering machine 10 and which can detect the axial position of an end surface edge region R of the lens L, which is clamped between the clamping bells 36, 38, in a direction parallel to the centering axis C.

Figure 17:
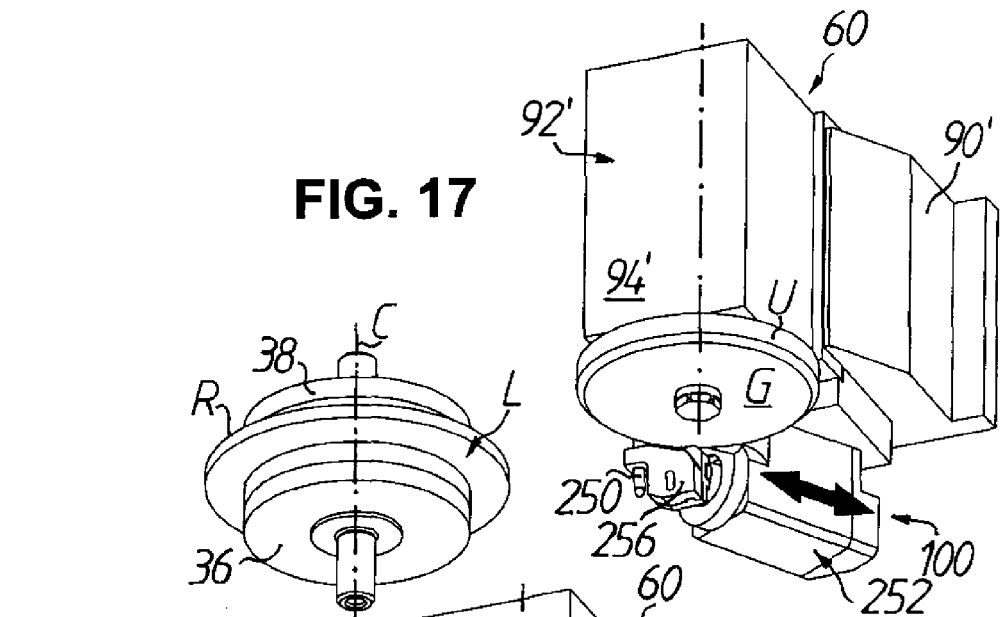
FIGS. 17 to 19 show perspective views of the processing unit, which is on the right in FIGS. 1 and 3, of the centering machine according to FIG. 1 in an illustration isolated from the rest of the centering machine without spray protection and cooling lubricant supply device for illustration of the working of an axial run-out measuring device, which is integrated in the centering machine, for checking the centering of the optical lens, which is held between the clamping bells and which is similarly schematically indicated in these figures.
Figure 18:
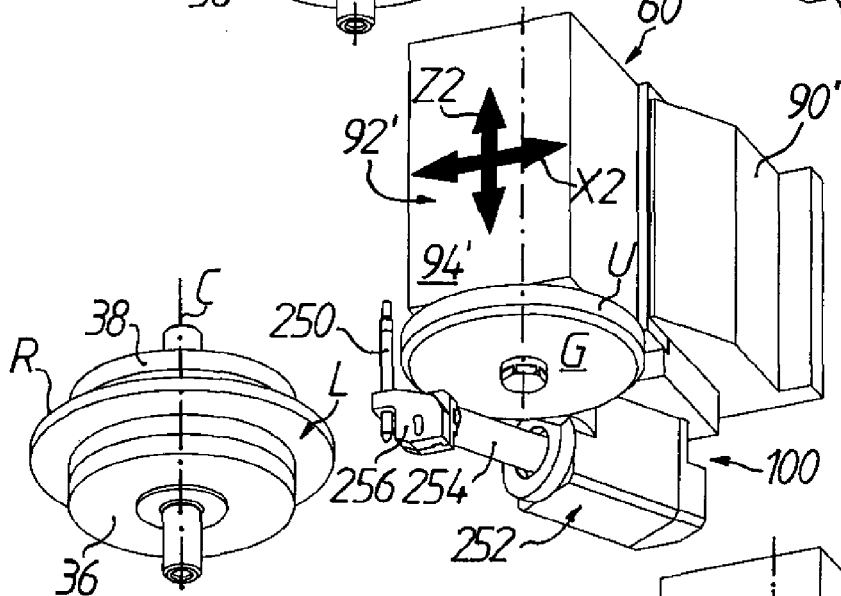
Figure 19:
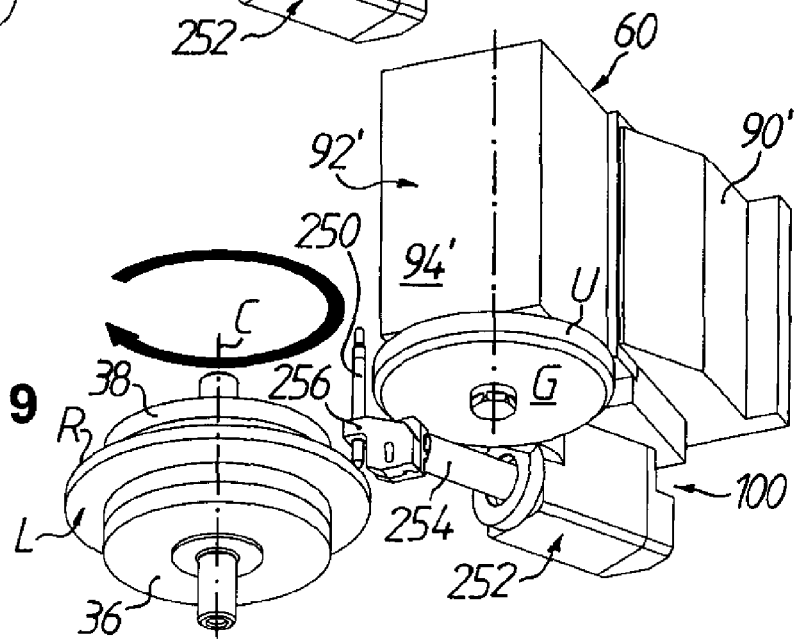

Details with respect thereto are subsequently illustrated with reference to FIGS. 17 to 19, from which for this purpose the spray protection device 96' and the cooling lubricant supply device 98' have been omitted. The axial run-out measuring device 100 has a commercially available contact caliper 250, which extends parallel to the centering axis C. For positioning with respect to the end surface edge region R—which is to be scanned—at the workpiece L, the caliper 250 is movable together with the processing unit 60, i.e. by the CNC axes X2, Z2, which is illustrated in FIG. 18 by the corresponding movement arrows. The caliper 250 can beforehand be moved according to the corresponding movement arrow in FIG. 17 with respect to the processing unit 60 from a protected park position (FIG. 17) behind the grinding wheel G to a measuring position (FIGS. 18 and 19) protruding relative to the grinding wheel G. For this purpose, a pneumatic cylinder 252 with end abutments is flange-mounted from below on the spindle block 90' of the processing unit 60. A piston rod 254 selectably movable out of the pneumatic cylinder 252 in that case carries at the free end thereof a mount 256 for the caliper 250. The mount 256 is in the illustrated embodiment so constructed that it can alternatively or additionally receive a further caliper (not illustrated) and, in particular, in a position turned through 90° relative to the caliper 250, whereby checking of the radial run-out of the lens L clamped between the clamping bells 36, 38 would equally be possible. The rotational movement arrow in FIG. 19 finally indicates that the lens L during the actual checking process, in which the caliper 250 contacts the end surface edge region R at the lens L, is rotated about the centering axis C.

In this fashion, a centering machine for, in particular, optical lenses has two centering spindles. The rotationally drivable centering spindle shafts of which are axially aligned with respect to a centering axis and are constructed at the ends for mounting the clamping bells. A stroke device is provided by which one centering spindle shaft is axially adjustable along the centering axis with respect to the other centering spindle shaft for alignment of the lens between the clamping bells. A clamping device for application of a clamping force clamps the aligned lens to a centering spindle shaft. At least one processing unit is movable relative to the centering axis and has a tool for edge processing of the clamped lens. In order to enable an optimized bell clamping process, the stroke device and the clamping device and/or a rotary drive for the axially adjustable centering spindle shaft are arranged coaxially with respect to the centering axis.

Variations and modifications are possible without departing from the scope and spirit of the present invention as defined by the appended claims.

We claim:

1. A centering machine for workpieces comprising:
    two centering spindles including respective rotationally drivable centering spindle shafts which are mounted in respective centering spindle housings and being axially aligned with respect to a centering axis,
    the centering spindle shafts being constructed for respective mounting of a respective clamping bell at mutually facing ends,
    said respective clamping bells mounted at the mutually facing ends,
    a stroke device which is for axially moving in an adjustable manner one of the centering spindle shafts with respect to the other one of the centering spindle shafts along the centering axis to transversely move a workpiece between the clamping bells when said clamping bells engage said workpiece until the workpiece has adapted an aligned position between the clamping bells which enables minimum spacing of the clamping bells for said workpiece,
    a clamping device for creating and applying a clamping force to one of the centering spindle shafts so as to clamp the workpiece aligned between the clamping bells,
    at least one processing unit with a tool for edge processing of the workpiece clamped between the clamping bells, the processing unit being movable relative to the centering axis,
    the stroke device and the clamping device being arranged coaxially with respect to the centering axis; and
    wherein the clamping device can be operated independently of said stroke device.

2. A centering machine according to claim 1, characterized in that the stroke device comprises a plunger coil drive which is operatively connected with the axially adjustable centering spindle shaft and which comprises at least one coil coaxial with respect to the centering axis and at least one permanent magnet co-operating with the coil.

3. A centering machine according to claim 2, characterized in that the permanent magnet is secured to a rotor part connected with the axially adjustable centering spindle shaft, whereas the coil surrounding the permanent magnet is mounted in a plunger coil drive housing in stationary position in the machine.

4. A centering machine according to claim 3, characterized in that the clamping device comprises an annular piston, which is mounted on the axially adjustable centering spindle shaft and on the side thereof remote from the clamping bell end of the axially adjustable centering spindle shaft defines an annular effective surface which bounds in the centering spindle housing an annular chamber by way of which the annular piston can be acted on pneumatically so as to generate the clamping force.

5. A centering machine according to claim 4, characterized in that the centering spindle with the axially adjustable centering spindle shaft is arranged above the other centering spindle, wherein the annular piston defines on the side thereof facing the clamping bell end of the axially adjustable centering spindle shaft a further annular effective surface which bounds in the centering spindle housing a further annular chamber by way of which the annular piston can be acted on pneumatically in order to ensure pneumatic counterbalancing at the axially adjustable centering spindle shaft.

6. A centering machine according to claim 5, characterized in that the annular piston is constructed to be unsealed.

7. A centering machine according to claim 1, characterized in that the axially adjustable centering spindle shaft is axially displaceable and rotatably mounted in the centering spindle housing by an air bearing arrangement.

8. A centering machine according to claim 1, characterized by an axial run-out measuring device for checking the centering, by which the axial position of an end face edge region of the workpiece clamped between clamping bells is detectable in a direction parallel to the centering axis.

9. A centering machine according to claim 8, characterized in that the axial run-out measuring device comprises a contact caliper which, for positioning with respect to the end face edge region to be scanned at the workpiece, is movable together with the processing unit.

10. A centering machine according to claim 9, characterized in that the caliper of the axial run-out measuring device is movable relative to the processing unit from a protected park position behind the workpiece to a measuring position protruding relative to the workpiece and conversely.

11. A centering machine according to claim 1, characterized in that the clamping device comprises an annular piston, which is mounted on the axially adjustable centering spindle shaft and on the side thereof remote from the clamping bell end of the axially adjustable centering spindle shaft defines an annular effective surface which bounds in the centering spindle housing an annular chamber by way of which the annular piston can be acted on pneumatically so as to generate the clamping force.

12. A centering machine according to claim 11, characterized in that the centering spindle with the axially adjustable centering spindle shaft is arranged above the other centering spindle, wherein the annular piston defines on the side thereof facing the clamping bell end of the axially adjustable centering spindle shaft a further annular effective surface which bounds in the centering spindle housing a further annular chamber by way of which the annular piston can be acted on pneumatically in order to ensure pneumatic counterbalancing at the axially adjustable centering spindle shaft.

13. A centering machine as defined claim 1, characterized by:
a cooling lubricant supply device for supply of a cooling lubricant to a grinding wheel rotatably mounted as a tool on a grinding spindle of a processing unit, said cooling lubricating supply device having a feed shoe, which is mounted at least indirectly on a grinding spindle housing and seated on a circumferential surface of the grinding wheel and which has a seating surface facing the grinding wheel, the seating surface having a shape substantially complementary with the circumferential surface of the grinding wheel and being provided centrally with a pocket-like recess into which the cooling lubricant can be fed under pressure, and a spring mechanism being provided, by which the feed shoe is biased with the seating surface thereof against the circumferential surface of the grinding wheel.

14. A centering machine according to claim 13, characterized in that the feed shoe is made of a machinable material, preferably plastic material, and the seating surface at the feed shoe is ground by the grinding wheel as a negative profile of the circumferential surface of the grinding wheel.

15. A centering machine according to claim 14, characterized in that the biasing force of the spring mechanism is settable.

16. A centering machine according to claim 15, characterized in that the feed shoe is pivotally connected by way of a shoe holder with a joint, which is fixed relative to a grinding spindle housing and which lies in front of the feed shoe as seen in the rotational direction of the grinding wheel so that the feed shoe is positionable substantially tangentially against the circumferential surface of the grinding wheel.

17. A centering machine according to claim 13, characterized in that the biasing force of the spring mechanism is settable.

18. A centering machine according to claim 17, characterized in that the feed shoe is pivotally connected by way of a shoe holder with a joint, which is fixed relative to a grinding spindle housing and which lies in front of the feed shoe as seen in the rotational direction of the grinding wheel so that the feed shoe is positionable substantially tangentially against the circumferential surface of the grinding wheel.

19. A centering machine for workpieces comprising:
two centering spindles including respective rotationally drivable centering spindle shafts which are mounted in respective centering spindle housings and being axially aligned with respect to a centering axis,
the centering spindle shafts being constructed for respective mounting of a respective clamping bell at mutually facing ends,
a stroke device which is for axially moving in an adjustable manner one of the centering spindle shafts with respect to the other one of the centering spindle shafts along the centering axis to align a workpiece between the clamping bells,
a clamping device for applying a clamping force to one of the centering spindle shafts so as to clamp the workpiece aligned between the clamping bells,
at least one processing unit with a tool for edge processing of the workpiece clamped between the clamping bells, the processing unit being movable relative to the centering axis, a
the stroke device and the clamping device being arranged coaxially with respect to the centering axis, and
the centering spindle shaft axially adjustable by way of the stroke device being rotationally drivable by a rotary drive arranged as the stroke device to be coaxial with respect to the centering axis.

20. A centering machine according to claim 19, characterized in that the rotary drive is constructed as an internal rotor torque motor with a stator mounted in the centering spindle housing and a rotor constantly surrounded by the stator and secured to the outer circumference of the axially adjustable centering spindle shaft, the rotor being longer than the stator and axially displaceable together with the axially adjustable centering spindle shaft relative to the stator.

21. A centering machine for workpieces comprising:
two centering spindles including respective rotationally drivable centering spindle shafts which are mounted in respective centering spindle housings and being axially aligned with respect to a centering axis,
the centering spindle shafts being constructed for respective mounting of a respective clamping bell at mutually facing ends,
a stroke device which is for axially moving in an adjustable manner one of the centering spindle shafts with respect to the other one of the centering spindle shafts along the centering axis to align a workpiece between the clamping bells,
a clamping device for applying a clamping force to one of the centering spindle shafts so as to clamp the workpiece aligned between the clamping bells,
at least one processing unit with a tool for edge processing of the workpiece clamped between the clamping bells, the processing unit being movable relative to the centering axis, a
the stroke device and the clamping device being arranged coaxially with respect to the centering axis,
the axially adjustable centering spindle shaft is axially displaceable and rotatably mounted in the centering spindle housing by an air bearing arrangement,
the centering spindle shaft axially adjustable by way of the stroke device being rotationally drivable by a rotary drive arranged as the stroke device to be coaxial with respect to the centering axis; and
the air bearing arrangement having at least two air bearing sections, wherein the rotary drive is arranged axially between the air bearing sections.

22. A centering machine for workpieces comprising:
two centering spindles including respective rotationally drivable centering spindle shafts which are mounted in respective centering spindle housings and being axially aligned with respect to a centering axis, the centering spindle shafts being constructed for respective mounting of a respective clamping bell at mutually facing ends, a stroke device which is for axially moving in an adjustable manner one of the centering spindle shafts with respect to the other one of the centering spindle shafts along the centering axis to align a workpiece between the clamping bells, a clamping device for applying a clamping force to one of the centering spindle shafts so as to clamp the workpiece aligned between the clamping bells, at least one processing unit with a tool for edge processing of the workpiece clamped between the clamping bells, the processing unit being movable relative to the centering axis, and the centering spindle shaft axially movable in an adjustable manner by way of the stroke device being rotationally drivable by a rotary drive arranged as the stroke device to be coaxial with respect to the centering axis.

23. A centering machine according to claim 22, characterized in that the rotary drive is constructed as an internal rotor torque motor with a stator mounted in the centering spindle housing and a rotor constantly surrounded by the stator and secured to the outer circumference of the axially adjustable centering spindle shaft, the rotor being longer than the stator and axially displaceable together with the axially adjustable centering spindle shaft relative to the stator.

24. A centering machine according to claim 22, characterized in that the axially adjustable centering spindle shaft is axially displaceable and rotatably mounted in the centering spindle housing by an air bearing arrangement.

25. A centering machine according to claim 24, characterized in that the air bearing arrangement has at least two air bearing sections, wherein the rotary drive is arranged axially between the air bearing sections.

26. A centering machine according to claim 22, characterized by an axial run-out measuring device for checking the centering, by which the axial position of an end face edge region of the workpiece clamped between clamping bells is detectable in a direction parallel to the centering axis.

27. A centering machine according to claim 26, characterized in that the axial run-out measuring device comprises a contact caliper which, for positioning with respect to the end face edge region to be scanned at the workpiece, is movable together with the processing unit.

28. A centering machine according to claim 27, characterized in that the caliper of the axial run-out measuring device is movable relative to the processing unit from a protected park position behind the workpiece to a measuring position protruding relative to the workpiece and conversely.

* * * * *